US011528462B2

(12) United States Patent
Iwakiri

(10) Patent No.: US 11,528,462 B2
(45) Date of Patent: Dec. 13, 2022

(54) DISPLAY CONTROL APPARATUS, METHOD FOR CONTROLLING DISPLAY CONTROL APPARATUS, AND STORAGE MEDIUM

(71) Applicant: CANON KABUSHIKI KAISHA, Tokyo (JP)

(72) Inventor: Yoshiki Iwakiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/116,556

(22) Filed: Dec. 9, 2020

(65) Prior Publication Data

US 2021/0092344 A1 Mar. 25, 2021

Related U.S. Application Data

(63) Continuation of application No. PCT/JP2019/021989, filed on Jun. 3, 2019.

(30) Foreign Application Priority Data

Jun. 13, 2018 (JP) .............................. JP2018-112723

(51) Int. Cl.
*H04N 13/117* (2018.01)
*H04N 13/282* (2018.01)

(52) U.S. Cl.
CPC ......... *H04N 13/117* (2018.05); *H04N 13/282* (2018.05)

(58) Field of Classification Search
CPC .. H04N 13/117; H04N 13/282; H04N 17/002; H04N 5/23206; H04N 21/2404; H04N 21/2187; H04N 21/21805; H04N 7/181; H04N 5/247; H04N 13/296; H04N 13/243; H04N 5/222; G09G 2370/025; G09G 2330/12; G09G 2370/22; G09G 2370/20; G09G 5/12; G09G 2354/00
USPC .......................................................... 348/43
See application file for complete search history.

(56) References Cited

U.S. PATENT DOCUMENTS

| | | | | |
|---|---|---|---|---|
| 5,586,254 A | * | 12/1996 | Kondo | ................ H04L 41/0846 714/25 |
| 2011/0095899 A1 | * | 4/2011 | Saito | ................... B61L 15/0036 340/691.6 |
| 2018/0054487 A1 | * | 2/2018 | Hebsur | .................. G06F 3/0304 |
| 2018/0082144 A1 | * | 3/2018 | Wakamatsu | ....... H04N 5/23264 |
| 2021/0121139 A1 | * | 4/2021 | Andreyev | ............ A61B 6/5276 |

FOREIGN PATENT DOCUMENTS

| | | | | | |
|---|---|---|---|---|---|
| CA | 3025471 A1 | * | 11/2017 | ......... | H04N 5/23216 |
| JP | 2008131443 A | * | 6/2008 | ............ | H04N 5/247 |
| JP | 2008131443 A | | 6/2008 | | |
| JP | 2014215828 A | | 11/2014 | | |
| JP | 2017152827 A | | 8/2017 | | |
| JP | 2017212591 A | | 11/2017 | | |

* cited by examiner

*Primary Examiner* — Loi H Tran
(74) *Attorney, Agent, or Firm* — Canon U.S.A., Inc. IP Division

(57) ABSTRACT

State information indicating states of a plurality of imaging apparatuses 100-*x* used for generating a virtual viewpoint image is acquired. At least one image type is determined from a plurality of image types indicating display formats of displaying the states of the plurality of imaging apparatuses 100-*x* based on the state information. Based on the determined image type, the states of the plurality of imaging apparatuses 100-*x* are displayed.

19 Claims, 22 Drawing Sheets

FIG. 5

| Dev | X | Y | Z | CONNECTION DESTINATION |
|---|---|---|---|---|
| CS | 0 | −40000 | 10000 | 01, 02 |
| 01 | −10000 | −35000 | 15000 | 03 |
| 02 | −30000 | −25000 | 15000 | 04 |
| 03 | −50000 | −15000 | 15000 | 05 |
| 04 | −65000 | −5000 | 15000 | 06 |
| 05 | −65000 | 5000 | 15000 | 07 |
| 06 | −50000 | 15000 | 15000 | 08 |
| 07 | −30000 | 25000 | 15000 | 09 |
| 08 | −10000 | 35000 | 15000 | 10 |
| 09 | 10000 | 35000 | 15000 | 11 |
| 10 | 30000 | 25000 | 15000 | 12 |
| 11 | 50000 | 15000 | 15000 | 13 |
| 12 | 65000 | 5000 | 15000 | 14 |
| 13 | 65000 | −5000 | 15000 | 15 |
| 14 | 50000 | −15000 | 15000 | 16 |
| 15 | 30000 | −25000 | 15000 | − |
| 16 | 10000 | −35000 | 15000 | − |

FIG. 6

| Dev | Iso | Iris | Shutter | State |
|---|---|---|---|---|
| 01 | 3200 | F8.0 | 1/120 | Normal |
| 02 | 3200 | F8.0 | 1/120 | Normal |
| 03 | 3200 | F8.0 | 1/120 | Normal |
| 04 | 3200 | F8.0 | 1/120 | Normal |
| 05 | 3200 | F8.0 | 1/120 | Normal |
| 06 | 3200 | F8.0 | 1/120 | Normal |
| 07 | 3200 | F8.0 | 1/120 | Normal |
| 08 | 3200 | F8.0 | 1/120 | Normal |
| 09 | 3200 | F8.0 | 1/120 | Normal |
| 10 | 3200 | F8.0 | 1/120 | Normal |
| 11 | 3200 | F8.0 | 1/120 | Normal |
| 12 | 3200 | F8.0 | 1/120 | Normal |
| 13 | 3200 | F8.0 | 1/120 | Normal |
| 14 | 3200 | F8.0 | 1/120 | Normal |
| 15 | 3200 | F8.0 | 1/120 | Normal |
| 16 | 3200 | F8.0 | 1/120 | Normal |

FIG. 12

| Dev | Iso | Iris | Shutter | State |
|---|---|---|---|---|
| 01 | 3200 | F8.0 | 1/120 | Normal |
| 02 | 3200 | F8.0 | 1/120 | Normal |
| 03 | 3200 | F8.0 | 1/120 | Normal |
| 04 | 3200 | F8.0 | 1/120 | Normal |
| 05 | 3200 | F8.0 | 1/120 | Normal |
| 06 | 3200 | F8.0 | 1/120 | Normal |
| 07 | 3200 | F8.0 | 1/120 | Normal |
| 08 | 3200 | F8.0 | 1/120 | Normal |

| Dev | Iso | Iris | Shutter | State |
|---|---|---|---|---|
| 09 | 3200 | F8.0 | 1/120 | Normal |
| 10 | 3200 | F8.0 | 1/120 | Normal |
| 11 | 3200 | F8.0 | 1/120 | Normal |
| 12 | 3200 | F8.0 | 1/120 | Normal |
| 13 | 3200 | F8.0 | 1/120 | Normal |
| 14 | 3200 | F8.0 | 1/120 | Normal |
| 15 | 3200 | F8.0 | 1/120 | Normal |
| 16 | 3200 | F8.0 | 1/120 | Normal |

FIG. 15

| Dev | Iso | Iris | Shutter | State |
|---|---|---|---|---|
| 01 | 3200 | F8.0 | 1/120 | Normal |
| 02 | 3200 | F8.0 | 1/120 | Normal |
| 03 | 3200 | F8.0 | 1/120 | Normal |
| 04 | 3200 | F8.0 | 1/120 | Normal |
| 05 | 3200 | F8.0 | 1/120 | Normal |
| 06 | 3200 | F8.0 | 1/120 | Normal |
| 07 | 3200 | F8.0 | 1/120 | Normal |
| 08 | 3200 | F8.0 | 1/120 | Normal |
| 09 | 3200 | F8.0 | 1/120 | Normal |
| 10 | 3200 | F8.0 | 1/120 | Normal |
| 11 | 3200 | F8.0 | 1/120 | NW Err |
| 12 | 3200 | F8.0 | 1/120 | Normal |
| 13 | 3200 | F8.0 | 1/120 | NW Err |
| 14 | 3200 | F8.0 | 1/120 | Normal |
| 15 | 3200 | F8.0 | 1/120 | NW Err |
| 16 | 3200 | F8.0 | 1/120 | Normal |

FIG. 17

| Dev | Iso | Iris | Shutter | State |
|---|---|---|---|---|
| 01 | 3200 | F8.0 | 1/120 | Normal |
| 02 | 3200 | F8.0 | 1/120 | Normal |
| 03 | 3200 | F8.0 | 1/120 | Normal |
| 04 | 3200 | F8.0 | 1/120 | Normal |
| 05 | 3200 | F8.0 | 1/120 | Normal |
| 06 | 3200 | F8.0 | 1/120 | Normal |
| 07 | 3200 | F8.0 | 1/120 | Normal |
| 08 | 3200 | F8.0 | 1/120 | Normal |

| Dev | Iso | Iris | Shutter | State |
|---|---|---|---|---|
| 09 | 3200 | F8.0 | 1/120 | Normal |
| 10 | 3200 | F8.0 | 1/120 | Normal |
| 11 | 3200 | F8.0 | 1/120 | NW Err |
| 12 | 3200 | F8.0 | 1/120 | Normal |
| 13 | 3200 | F8.0 | 1/120 | NW Err |
| 14 | 3200 | F8.0 | 1/120 | Normal |
| 15 | 3200 | F8.0 | 1/120 | NW Err |
| 16 | 3200 | F8.0 | 1/120 | Normal |

DISPLAY CONTROL APPARATUS, METHOD FOR CONTROLLING DISPLAY CONTROL APPARATUS, AND STORAGE MEDIUM

CROSS-REFERENCE TO RELATED APPLICATIONS

This application is a Continuation of International Patent Application No. PCT/JP2019/021989, filed Jun. 3, 2019, which claims the benefit of Japanese Patent Application No. 2018-112723, filed Jun. 13, 2018, both of which are hereby incorporated by reference herein in their entirety.

BACKGROUND

Field

The present disclosure relates to a display control apparatus, a method of controlling the display control apparatus, and a storage medium.

BACKGROUND ART

In the related art, there has been proposed a technique of imaging an object in synchronization from a plurality of directions by a plurality of imaging apparatuses installed at different positions and generating a virtual viewpoint image (a multi-viewpoint image) from a plurality of images obtained as a result of the imaging. The virtual viewpoint image is an image representing a view seen from a virtual viewpoint without having a restriction on the installation positions of the imaging apparatuses.

PTL 1 discloses a technique in which a virtual viewpoint operator selects a preferred viewpoint based on one or more images and generates a virtual viewpoint image from the images and information on the selected viewpoint. PTL 1 also discloses a UI (user interface) for allowing a virtual viewpoint operator to select a desired viewpoint.

CITATION LIST

Patent Literature

PTL 1: Japanese Patent Laid-Open No. 2014-215828

In various systems including a plurality of apparatuses, displaying states of the apparatuses constituting the system makes it possible to inform a system supervisor of the state of the system such as an abnormality.

However, for example, in an imaging system including a plurality of imaging apparatuses for generating a virtual viewpoint image, information needed by a system supervisor varies depending on the state of the imaging system, and it may be insufficient only to display the state of the imaging apparatus. For example, when vibration occurs in an imaging apparatus due to a mounting failure of the imaging apparatus or the like, a person who manages the imaging apparatus has to go a place where the imaging apparatus is installed to deal with the vibration. Therefore, it is desired to appropriately display the states of a plurality of imaging apparatuses.

SUMMARY

According to one aspect of the present disclosure, there is provided a display control apparatus comprising: an acquisition unit configured to acquire state information which indicates states of a plurality of imaging apparatuses and which is used in generating a virtual viewpoint image, a first determination unit configured to determine, based on the state information acquired by the acquisition unit, at least one image type from a plurality of image types indicating display formats in which the states of the plurality of imaging apparatuses are displayed, and a display control unit configured to perform control such that the states of the plurality of imaging apparatuses are displayed based on the image type determined by the first determination unit.

Further features of the present disclosure will become apparent from the following description of exemplary embodiments with reference to the attached drawings.

BRIEF DESCRIPTION OF THE DRAWINGS

FIG. 5 is a diagram illustrating an example of data stored in a data storage unit.

FIG. 6 is a diagram illustrating an example of state information.

FIG. 12 is a diagram illustrating an example of a parameter indication UI image.

FIG. 15 is a diagram illustrating an example of state information.

FIG. 17 is a diagram illustrating an example of a parameter indication UI image.

DESCRIPTION OF THE EMBODIMENTS

First Embodiment

First, a first embodiment is described below. In this embodiment, an example is described for a case where a UI (user interface) displayed is switched depending on a content of an abnormality of an apparatus. According to the present embodiment, a system supervisor can quickly identify an apparatus where an abnormality occurs, a content of the abnormality, and an impact range.

Figure 1:
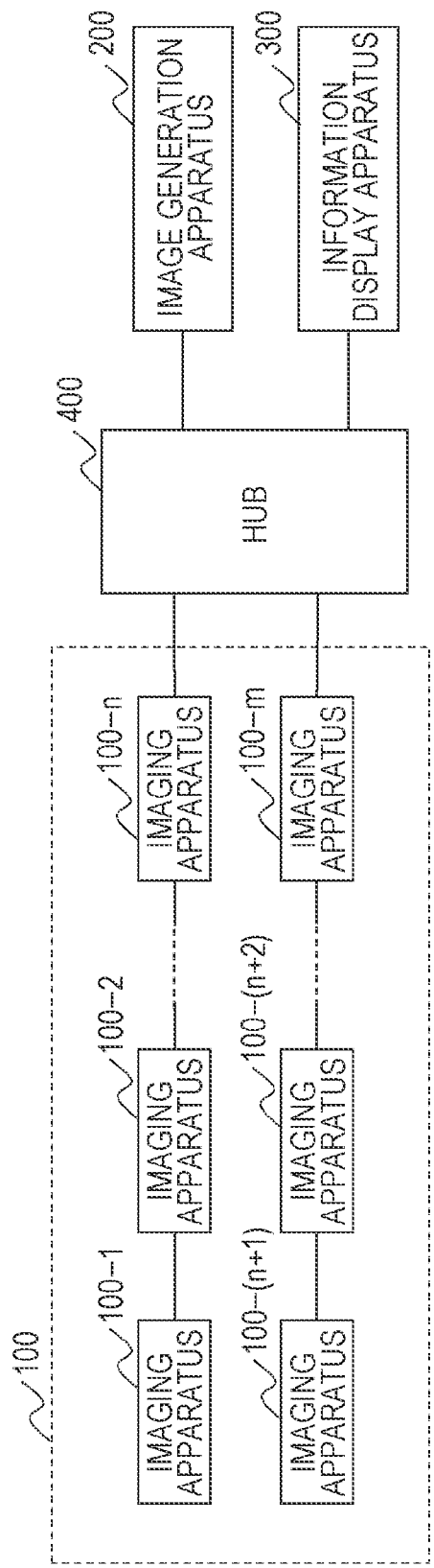
FIG. 1 is a diagram illustrating an example of a configuration of an imaging system.

FIG. 1 is a diagram illustrating an example of a configuration of an imaging system according to the present embodiment. In the present embodiment, the imaging system includes an imaging apparatus group 100 including a plurality of imaging apparatuses 100-1, 100-2, . . . , 100-$m$, an image generation apparatus 200, an information display apparatus 300, and a HUB 400. The apparatuses are interconnected via a transmission cable for transmitting an image and/or control information such that they can communicate with each other. Specific examples of transmission cables include a GbE (Gigabit Ethernet) cable and 10 GbE cable which are Ethernet (registered trademark) cables according to IEEE standards. However, the transmission cable is not limited thereto, and another type of cable may be used. Wireless communication may be employed as communication between apparatuses.

The imaging apparatus group 100 includes m imaging apparatuses (imaging apparatuses—100-1, 100-2, . . . , 100-$m$). Hereinafter, when a discussion is concerned not with a specific imaging apparatus but is applicable generally to any of imaging apparatuses 100-1, 100-2, . . . , and 100-$m$, then an expression "imaging apparatus 100-$x$" or "imaging apparatuses 100-$x$" is used to generically denote them. Here, m, n (described later), and x are each an integer.

Imaging apparatuses 100-$x$ located adjacent to each other (for example, an imaging apparatus 100-1 and an imaging apparatus 100-2) are connected to each other via a transmission cable. The imaging apparatus 100-$x$ transmits a captured image and state information of the imaging apparatus 100-$x$ to the image generation apparatus 200 and the information display apparatus 300. The state information will be described later. In FIG. 1, the imaging apparatus 100-1 is interconnected with the imaging apparatus 100-2. In addition to the imaging apparatus 100-1, the imaging apparatus 100-2 is also interconnected with another imaging apparatus (not shown) located adjacent to the imaging apparatus 100-2. An imaging apparatus 100-$n$ is interconnected with an imaging apparatus (not shown) adjacent to the imaging apparatus 100-$n$. The imaging apparatus 100-$n$ is also interconnected with the HUB 400. That is, in the present embodiment, a daisy chain is employed as a network topology. In the present embodiment, there are two such connection groups. The other one is a connection group including imaging apparatuses from an imaging apparatus 100-($n$+1) to an imaging apparatus 100-$m$, which are also interconnected in a similar manner. The number of connection groups is not limited to two, but it may be one or three or more. The network topology is not limited to a particular type and may be a ring type, a mesh type, a star type, a bus type, a tree type, or any combination of the above-described types.

Figure 2:
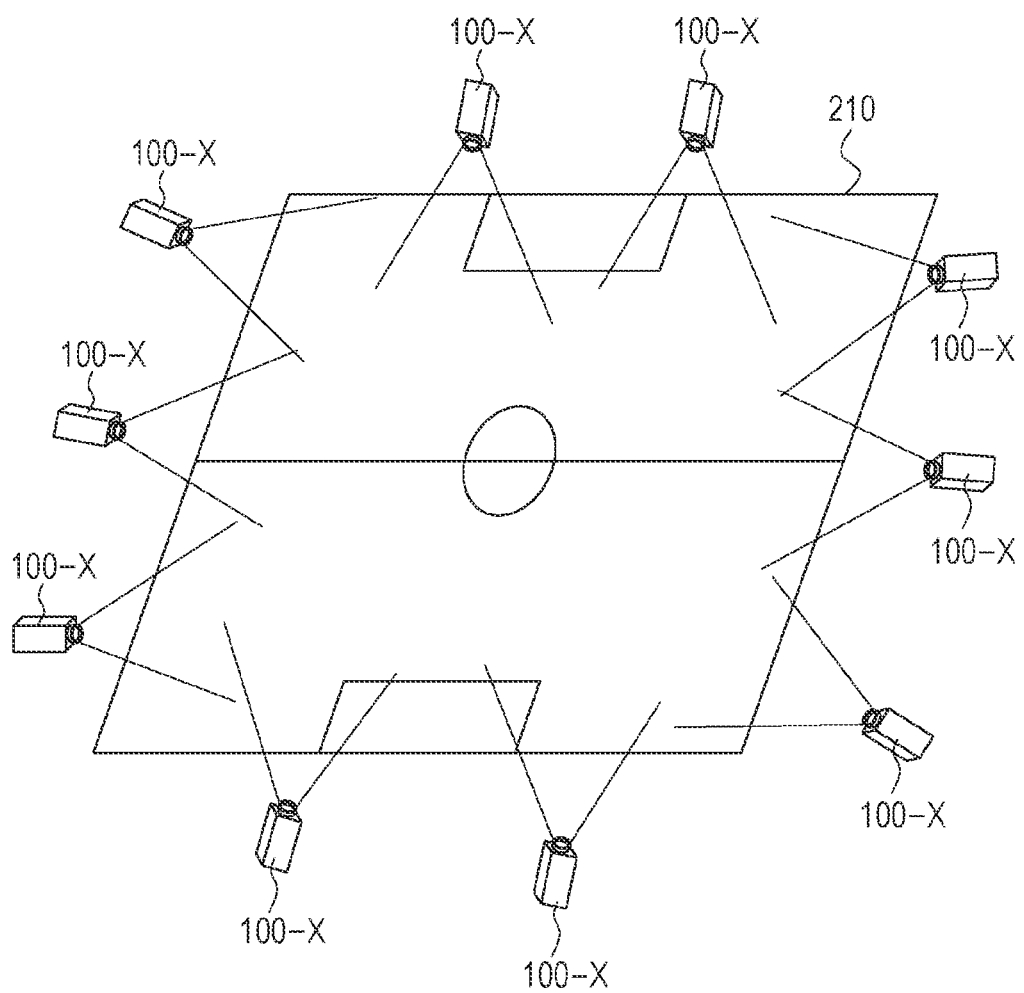
FIG. 2 is a diagram illustrating an example of a layout of positions of imaging apparatuses.

The imaging apparatuses 100-$x$ are arranged so as to surround a stadium such as a soccer field or a specific object. FIG. 2 is a diagram illustrating an example of a position layout of the imaging apparatuses 100-$x$. In the example illustrated in FIG. 2, the plurality of imaging apparatuses 100-$x$ are arranged such that all or part of the region of the stadium 210 such as a soccer field can be imaged by the plurality of imaging apparatuses 100-$x$.

The plurality of imaging apparatuses 100-$x$ are, for example, digital cameras, and perform imaging at the same timing according to a synchronization signal given from an external synchronization apparatus (not shown). Images captured by the imaging apparatuses 100-$x$ are transmitted, via the transmission cable and the HUB 400, to the image generation apparatus 200 and the information display apparatus 300. The imaging apparatus 100-$x$ may be a camera configured to capture a still image or a camera configured to capture a moving image, or a camera configured to capture both a still image and a moving image.

The image generation apparatus 200 is interconnected with the imaging apparatuses 100-$x$ via the HUB 400. The image generation apparatus 200 stores images captured by the imaging apparatuses 100-$x$. When virtual viewpoint information is input by operating a user terminal, the image generation apparatus 200 generates a virtual viewpoint image corresponding to the virtual viewpoint information by using images captured by the plurality of imaging apparatuses 100-$x$. The virtual viewpoint information includes at least position information and direction information. The position information is information indicating a position with respect to a predetermined position such as a center of the stadium 210 (more specifically, for example, a position in a front-rear direction, a left-right direction, and an up-down direction with respect to the predetermined position). The direction information is information indicating a direction from the predetermined position (for example, the direction is indicated by an angle from each of axes respectively extending from the predetermined position in the front-rear direction, the left-right direction, and the up-down direction in a three-dimensional orthogonal coordinate system).

The image generation apparatus 200 is, for example, a server apparatus and has a database function of storing images captured by the imaging apparatuses 100-$x$ and an image processing function of generating a virtual viewpoint image based on the positions and the directions of the imaging apparatuses 100-$x$. The database used by the image generation apparatus 200 includes a background image of a scene of a competition site in which there is no subject and which is imaged in advance before a start of a competition.

The information display apparatus 300 is interconnected with the imaging apparatuses 100-$x$ and the image generation apparatus 200 via the HUB 400. The information display apparatus 300 receives captured images captured by the imaging apparatuses 100-$x$ and state information of the imaging apparatuses 100-$x$, and displays them on a display screen (a display unit 508) which will be described later. The state information of the image generation apparatus 200 is also received and displayed on the display screen. The information display apparatus 300 is typically watched by a supervisor. The supervisor constantly watches the state of the imaging apparatus group 100 and the state of the image generation apparatus 200 by using the captured image or the like displayed on the display screen.

The HUB 400 distributes the captured images received from the imaging apparatuses 100-$x$ to the image generation apparatus 200 and the information display apparatus 300.

Figure 3:
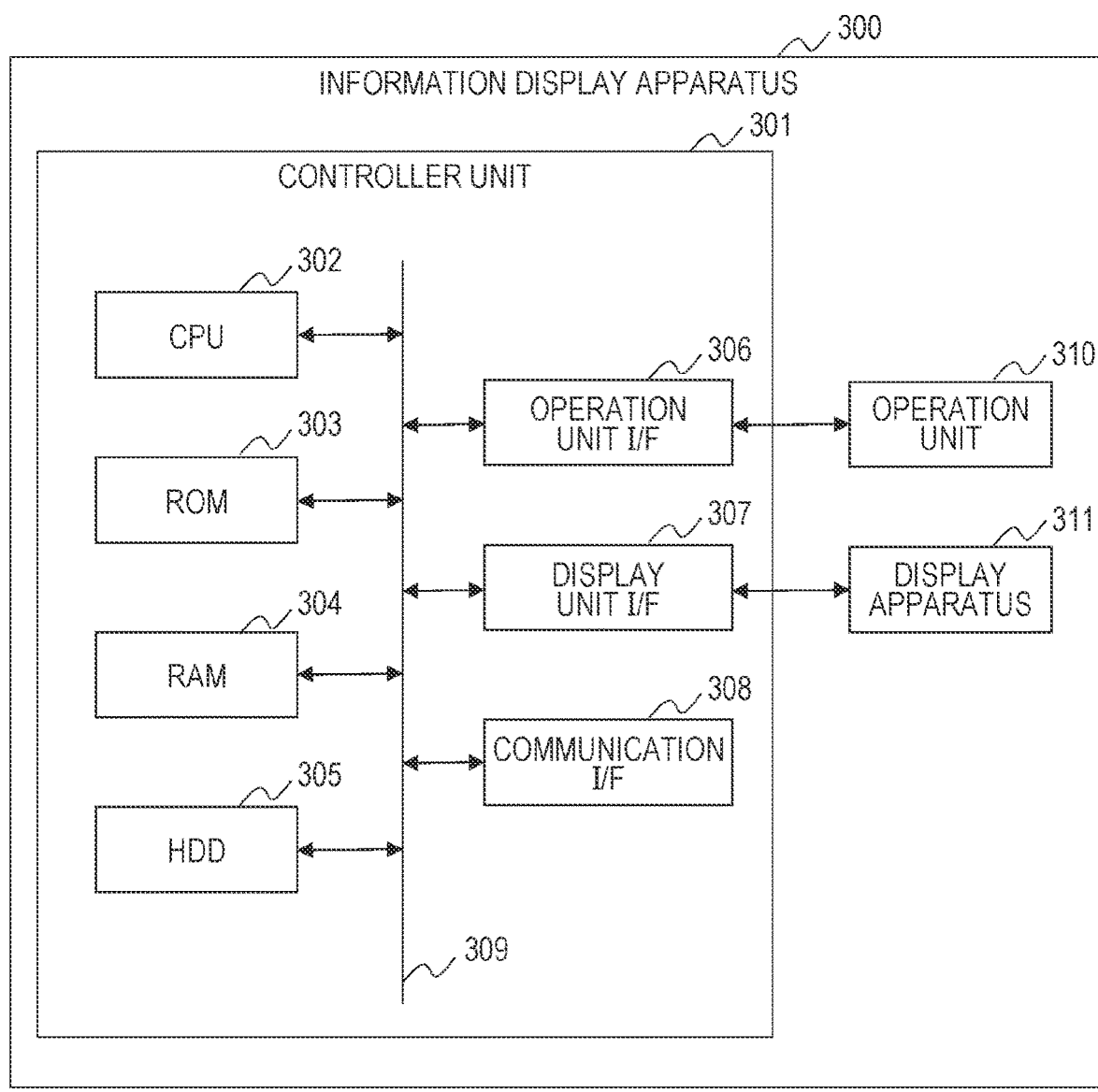
FIG. 3 is a diagram illustrating an example of a hardware configuration of an information display apparatus.

Next, an example of a configuration of the information display apparatus 300 is described with reference to FIG. 3. FIG. 3 is a diagram illustrating an example of a hardware configuration of the information display apparatus 300.

The information display apparatus 300 includes a controller unit 301, an operation unit 310, and a display apparatus 311.

The controller unit 301 includes a CPU 302. The CPU 302 boots an OS (Operating System) by a boot program stored in a ROM 303. The CPU 302 executes an application program stored in an HDD (Hard Disk Drive) 305 on this OS. The CPU 302 realizes various processes such as those shown in FIGS. 7, 8, 11, 13, 20, and 21 and various functions such as those shown in FIGS. 4 and 19 by executing an application program. A RAM 304 is used as a work area by the CPU 302. The HDD 305 stores an application program and/or the like. The HDD 305 is an example of a storage medium.

The CPU 302 is interconnected with the ROM 303, the RAM 304, the HDD 305, the operation unit IN 306, the display unit IN 307, and the communication I/F 308 via a system bus 309. The operation unit IN 306 is an interface with the operation unit 310. The operation unit IN 306 sends information, input by the system supervisor via the operation unit 310, to the CPU 302. The operation unit 310 includes, for example, at least one of a touch panel, a mouse, and a keyboard. The display unit I/F 307 outputs an image to be displayed on the display apparatus 311 to the display apparatus 311. The display apparatus 311 includes a computer display. The computer display is a display panel such as a liquid crystal panel or an organic EL panel. The communication I/F 308 is connected to a transmission cable. The communication I/F 308 inputs and outputs information to and from an external apparatus (a user terminal or the HUB 400) via a transmission cable. Not all of elements shown in FIG. 3 are essential elements of the information display apparatus 300. For example, the display apparatus 311 is not an essential element. The information display apparatus 300 is also capable of displaying an image on an external display apparatus connected via a cable or a network.

Figure 4:
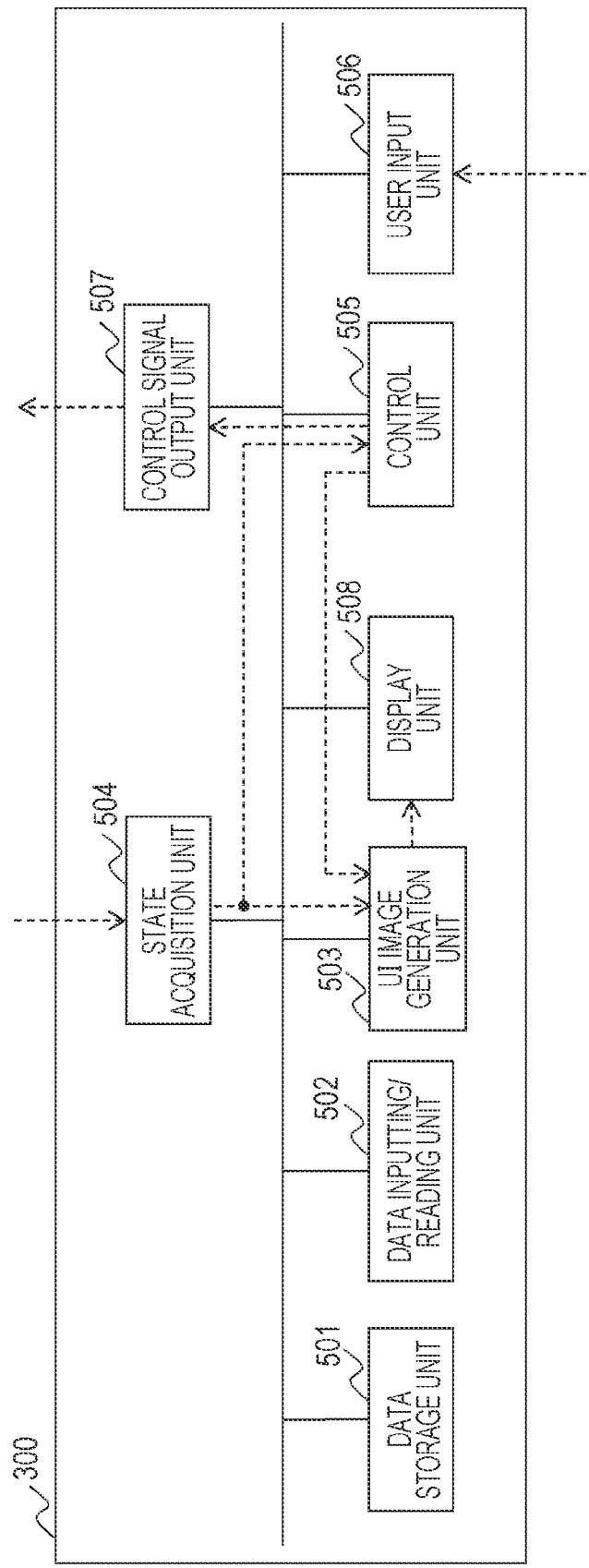
FIG. 4 is a diagram illustrating an example of a functional configuration of an information display apparatus.

FIG. 4 is a diagram illustrating an example of a functional configuration of the information display apparatus 300. The information display apparatus 300 includes a data storage unit 501, a data inputting/reading unit 502, a UI image generation unit 503, a state acquisition unit 504, a control unit 505, a user input unit 506, a control signal output unit 507, and a display unit 508. These are capable of transmitting and receiving data to and from each other under the control of the control unit 505. The data storage unit 501 in FIG. 4 corresponds to the HDD 305 in FIG. 3. The data inputting/reading unit 502, the UI image generation unit 503, and the control unit 505 in FIG. 4 correspond to the CPU 302 in FIG. 3. The state acquisition unit 504 and the control signal output unit 507 in FIG. 4 correspond to the communication IN 308 in FIG. 3. The user input unit 506 in FIG. 4 corresponds to the operation unit IN 306 and operation unit 310 in FIG. 3. The display unit 508 in FIG. 4 corresponds to the display unit I/F 307 and the display apparatus 311. An example of a configuration of each unit is described in detail below.

The data storage unit 501 stores imaging environment information that is data necessary for the UI image generation unit 503 to display a UI. The imaging environment information includes at least one of the following:

Layout data of the stadium 210
Identification information of the imaging apparatus 100-$x$
Installation coordinate information of the imaging apparatus 100-$x$
Connection destination information of the imaging apparatus 100-$x$
Installation coordinate information of the information display apparatus 300
Connection destination information of the information display apparatus 300

The installation coordinate information is given as XYZ coordinate information where the origin thereof is set at a predetermined position (for example, the center of the stadium 210). The installation coordinate information is also referred to as XYZ information. The connection destination information is information indicating which apparatus is connected via a transmission cable (a network cable).

FIG. 5 illustrates an example of data of the imaging environment information other than the layout data of the stadium 210. FIG. 5 shows information of one information display apparatus 300 and sixteen imaging apparatuses 100-$x$. The first embodiment is described with reference to the example shown in FIG. 5. "Dev" in FIG. 5 is identification information of an apparatus. The identification information of information display apparatus 300 is CS. CS is a coined term that is an acronym for Control Station. The identification information of the imaging apparatus 100-$x$ is given by a 2 digit numerical value. "X, Y, Z" in FIG. 5 are coordinate values indicating the installation position of the information display apparatus 300 or the imaging apparatus 100-$x$. The unit of the coordinate values in FIG. 5 is millimeter. "Connection destination" in FIG. 5 is identification information of an apparatus that is a connection destination to which the information display apparatus 300 or the imaging apparatus 100-$x$ is connected via a network. For example, in FIG. 5, the CS, that is the information display apparatus 300, is connected to the imaging apparatus 100-01 and the imaging apparatus 100-02 via the HUB 400.

The data storage unit 501 is not necessarily disposed in the information display apparatus 300, but may be disposed in an external storage apparatus. The data storage unit 501 for storing information on the imaging apparatus 100-$x$ may be provided in each imaging apparatus 100-$x$.

The data inputting/reading unit 502 reads various kinds of data from the data storage unit 501 and outputs the data to the UI image generation unit 503.

The UI image generation unit 503 generates a UI image for use in monitoring the imaging apparatuses 100-$x$ based on the data acquired from the data inputting/reading unit 502 and the state information acquired from the state acquisition unit 504. The UI image is an image that displays the states of the plurality of imaging apparatuses 100-$x$. Examples of the state information and the UI image will be described later. The UI image generation unit 503 outputs the generated UI image to the display unit 508 as a display image, and performs control such that the UI image is displayed on the display apparatus 311.

The state acquisition unit 504 acquires state information of each imaging apparatus 100-$x$ and outputs the acquired state information to the UI image generation unit 503 and the control unit 505. When a change in the state information is detected, the UI image generation unit 503 updates the generated UI image. FIG. 6 illustrates an example of state information indicating states of a plurality of imaging apparatuses 100-$x$. "Dev" in FIG. 6 is identification information of the imaging apparatus 100-$x$. "Iso", "Iris", and "Shutter" in FIG. 6 are values of ISO, iris, and shutter speed set in the imaging apparatus 100-$x$. These values relate to exposure. "Iso", "Iris", and "Shutter" in FIG. 6 are also referred to as exposure setting values. The exposure setting values are examples of imaging parameters. "State" in FIG. 6 indicates a state of the imaging apparatus 100-$x$. In "State", one of a plurality of states including at least the following four states is set:

Normal
NW Err
Vib
Obstacle

"Normal" indicates a normal state. "NW Err" indicates a state in which communication between the information display apparatus 300 and the imaging apparatus 100-x cannot be performed due to a network error. An example of a possible cause of the network error is a disconnection of a network cable or a power-off of the imaging apparatus 100-x. "Vib" indicates that the imaging apparatus 100-x is vibrating. An example of a possible cause of the vibration of the imaging apparatus 100-x is an abnormality in installation, and another example is existence of an external force applied to the imaging apparatus. "Obstacle" indicates a state in which an obstacle appears in a captured image. Examples of possible obstacles are a part of a body of an audience, an object such as a baggage, an insect, and the like.

The control unit 505 issues a control instruction to each unit of the information display apparatus 300 based on the state information received from the state acquisition unit 504 or the operation information received from the user input unit 506. For example, when the control unit 505 receives the state information of the imaging apparatus 100-x from the state acquisition unit 504, the control unit 505 determines the UI image type based on the exposure setting values and the state of the imaging apparatus 100-x, and outputs the UI image type to the UI image generation unit 503. The UI image type is an image type of a UI image, that is, a format of displaying states of a plurality of imaging apparatuses 100-x. When the control unit 505 acquires operation information indicating a UI switching instruction from the user input unit 506, the control unit 505 determines a UI image type corresponding to the acquired information and outputs the UI image type to the UI image generation unit 503. The UI image types include at least the following:

Interconnection indication
parameter indication
actual position indication

The interconnection indication is an image type of an interconnection indication UI image. The interconnection indication UI image is an image of displaying a network connection configuration of the information display apparatus 300 and all imaging apparatuses 100-x.

The parameter indication is an image type of a parameter indication UI image. The parameter indication UI image is an image of displaying a list of exposure setting values that are imaging parameters of the plurality of imaging apparatuses 100-x.

The actual position indication is a type of an actual position indication UI image. The actual position indication UI image is an image of displaying installation positions of the stadium the imaging apparatuses 100-x, and more specifically an image of displaying, on a map, the positions at which the plurality of imaging apparatuses 100-x are disposed.

A more specific determination process of determining the UI image type and details of the respective UI images will be described later.

The user input unit 506 accepts operation information input to the operation unit 310 and outputs the operation information to the control unit 505.

The control signal output unit 507 outputs a control signal given from the control unit 505 to the outside. An output destination is, for example, an imaging apparatus 100-x. Examples of control signals are those for controlling zoom, focus, iris, ISO, shutter speed, and ND filter switching.

The display unit 508 includes a frame buffer and a display panel. The display unit 508 stores (overwrites) the display image output from the UI image generation unit 503 in the frame buffer. Thereafter, the display unit 508 reads the display image stored in the frame buffer at a predetermined refresh rate and displays it on the display apparatus 311.

Figure 7:
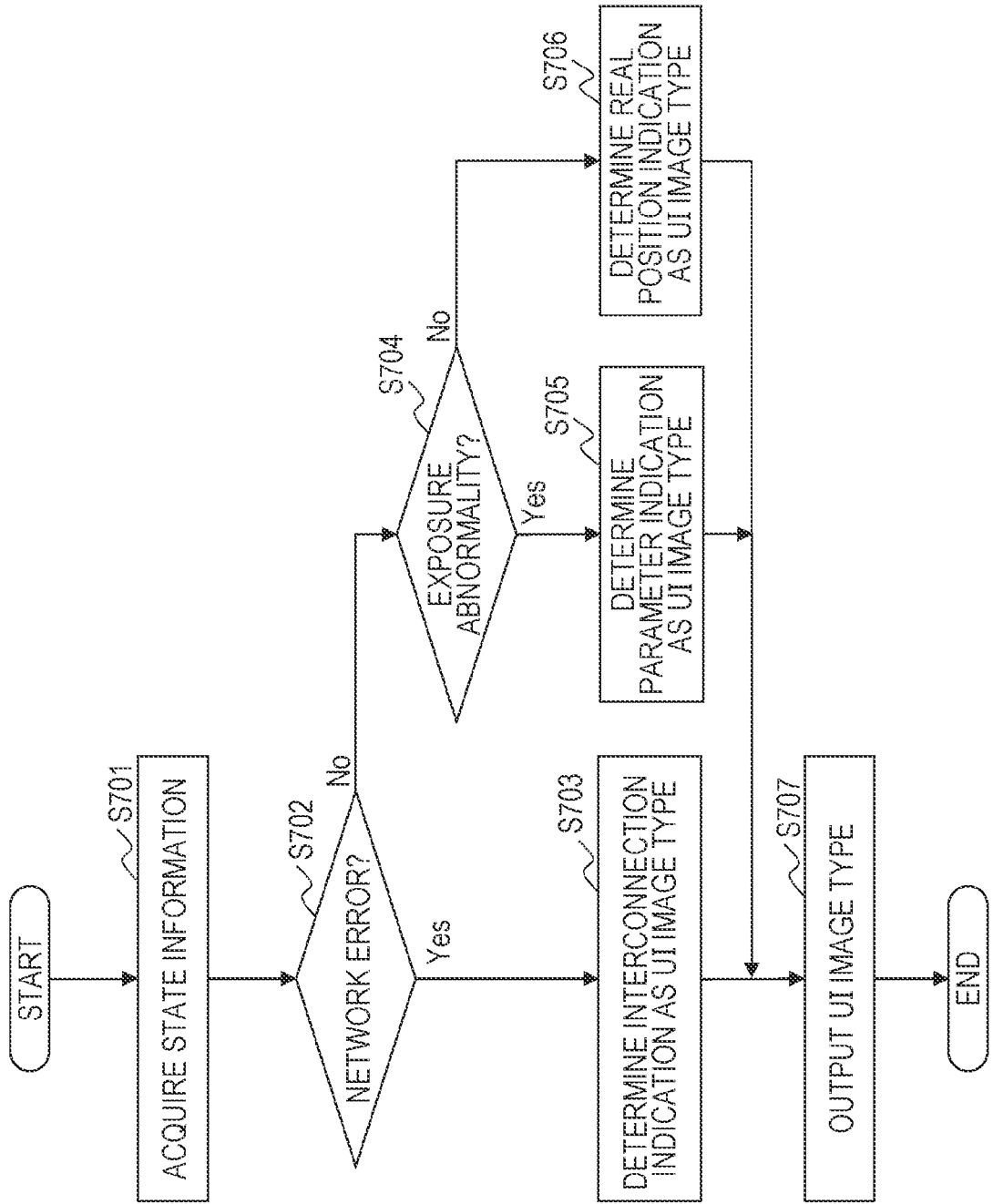
FIG. 7 is a flowchart illustrating an example of a UI image type determination process.

(Method of determining UI image type depending on an abnormality content) FIG. 7 is a flowchart illustrating an example of a UI image type determination process in which the control unit 505 determines a UI image type based on the state information acquired from the state acquisition unit 504.

In S701, the control unit 505 acquires state information from the state acquisition unit 504.

In S702, the control unit 505 determines, based on the acquired state information, whether or not there is an imaging apparatus 100-x having a network error in the imaging apparatuses 100-x included in the imaging apparatus group 100. More specifically, the control unit 505 determines whether or not there is an imaging apparatus 100-x whose item "State" of the state information shown in FIG. 6 is "NwErr". In a case where the control unit 505 determines that there is an imaging apparatus 100-x having a network error, the control unit 505 advances the process to S703. In a case where the control unit 505 determines that there is no imaging apparatus 100-x having a network error, the control unit advances the process to S704.

In S703, the control unit 505 selects the interconnection indication from the plurality of UI image types, and determines that the UI image type to be used for the UI image is the interconnection indication.

In S704, based on the acquired state information, the control unit 505 determines whether or not the imaging apparatuses 100-x in the imaging apparatus group 100 include an imaging apparatus 100-x having an abnormality in terms of exposure. In a case where one of the following cases occurs, the control unit 505 determines that there is an imaging apparatus 100-x having an abnormality in terms of exposure. A first case is that there is one or more imaging apparatuses 100-x having a value of the item "Iso" in the state information different from the values of "Iso" of the other imaging apparatuses 100-x. A second case is that there is one or more imaging apparatuses 100-x having a value of the item "Iris" in the state information different from the values of "Iris" of the other imaging apparatuses 100-x. A third case is that there is one or more imaging apparatuses 100-x having a value of the item "Shutter" in the state information different from the values of "Shutter" of the other imaging apparatuses 100-x. In a case where the control unit 505 determines that there is an imaging apparatus 100-x having an exposure abnormality, the control unit 505 advances the process to S705. In a case where the control unit 505 determines that there is no imaging apparatus 100-x having an exposure abnormality, the control unit 505 advances the process to S706. The exposure abnormality is an example of an imaging parameter error.

In S705, the control unit 505 selects the parameter indication from the plurality of UI image types, and determines that the UI image type to be used for UI image is the parameter indication.

In S706, the control unit 505 selects the actual position indication from among the plurality of UI image types, and determines that the UI image type to be used for the UI image is the actual position indication. The actual position indication is selected in a case where all the imaging apparatuses 100-x are in normal states or in a case where there is an imaging apparatus 100-x which whose "State" shown in FIG. 6 is "Vib" or "Obstacle".

The process from S702 to S706 is an example of the first determination process for determining one UI image type from the plurality of UI image types based on the state information. In the present embodiment, the control unit 505 determines the UI image type based on the error type of the imaging apparatus 100-x.

In S707, the control unit 505 outputs information indicating the determined UI image type to the UI image generation unit 503.

(Interconnection Indication UI Image)

Next, a processing flow in which the UI image generation unit 503 generates a UI image according to the UI image type acquired from the control unit 505 and examples of UI images will be described.

Figure 8:
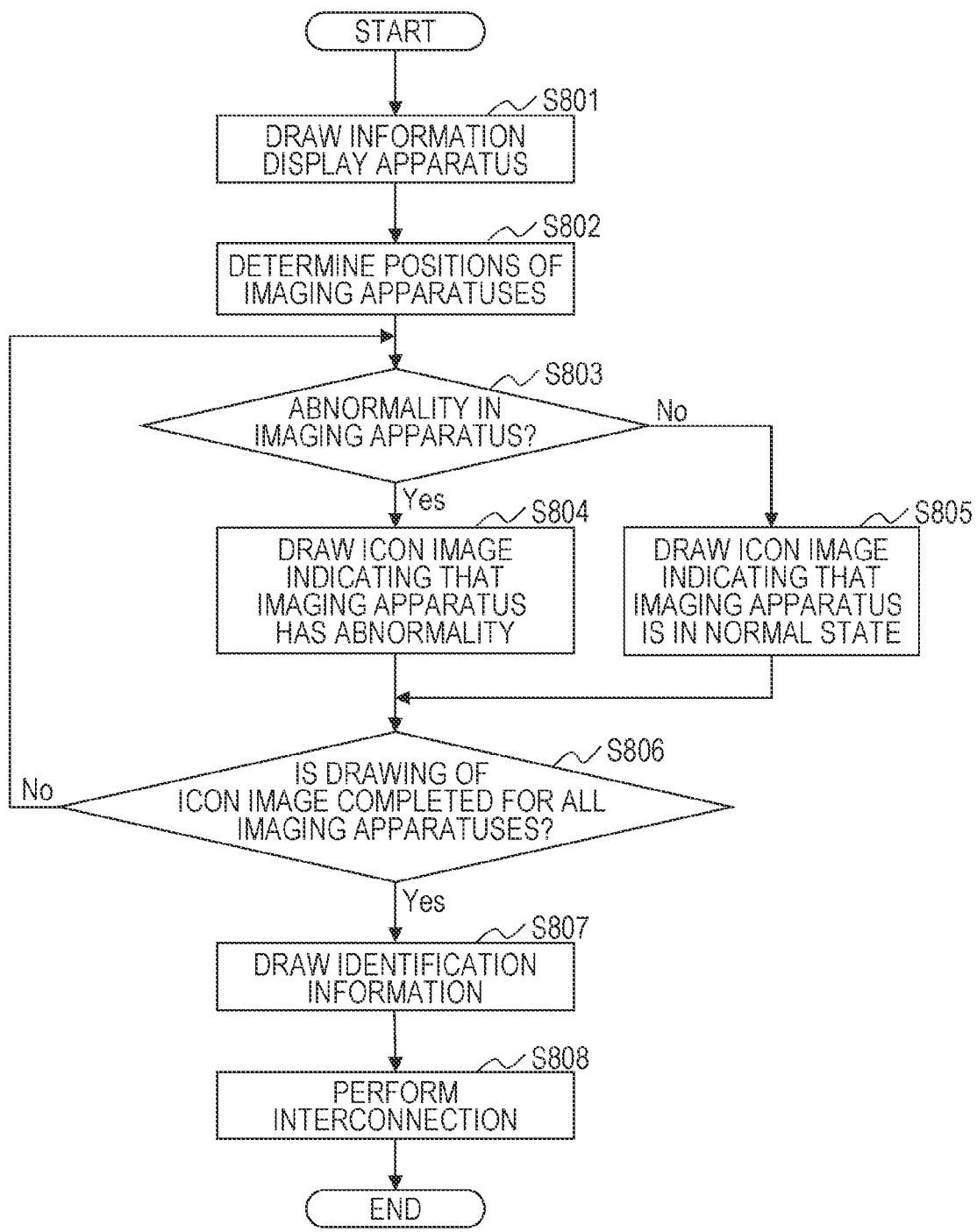
FIG. 8 is a flowchart illustrating an example of a process of generating an interconnection indication UI image.
Figure 9A:
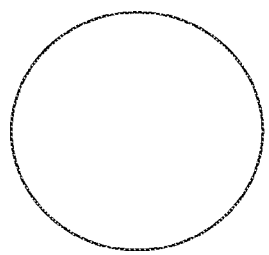
FIG. 9A is a diagram illustrating an example of an icon indicating an imaging apparatus displayed on a UI image.

First, a process of generating an interconnection indication UI image and an example of an interconnection indication UI image will be described. FIG. 8 is a flowchart illustrating an example of an interconnection indication UI image generation process that is a process of generating an interconnection indication UI image. The interconnection indication UI image generation process shown in FIG. 8 is executed in a case where, in the process shown in FIG. 7, the UI image generation unit 503 acquires the interconnection indication as the UI image type from the control unit 505. The order of executing the processing steps of the interconnection indication UI image generation is not limited to the order illustrated in FIG. 8. FIG. 9 illustrates examples of imaging apparatus icons displayed by UI images. FIG. 10 illustrates an example of an interconnection indication UI image.

In S801, the UI image generation unit 503 draws a rectangle representing the information display apparatus 300. The drawing in the present embodiment is performed by writing information indicating a graphical shape or the like into a UI image memory thereby generating a UI image.

In S802, the UI image generation unit 503 determines positions in the interconnection indication UI image for the respective imaging apparatuses 100-x included in the imaging apparatus group 100 according to the connection destination information in the imaging environment information.

In S803, the UI image generation unit 503 selects one imaging apparatus 100-x for which an icon has not been drawn in S804 or S805. The UI image generation unit 503 then determines whether or not the selected imaging apparatus 100-x is in an abnormal state based on the state information acquired from the state acquisition unit 504. In a case where the UI image generation unit 503 determines that the selected imaging apparatus 100-x is in an abnormal state, the UI image generation unit 503 advances the process to S804. In a case where the UI image generation unit 503 determines that the selected imaging apparatus 100-x is not in an abnormal state, the UI image generation unit 503 advances the process to S805. The abnormal state of the imaging apparatus 100-x occurs in a case where the item "State" of the state information shown in FIG. 6 of the selected imaging apparatus 100-x is other than "Normal" or an exposure setting value of the selected imaging apparatus 100-x is abnormal. The exposure setting value is abnormal in a case where the value of at least one of "Iris", "Iso", and "Shutter" of the imaging apparatus 100-x is not normal. The normal value of "Iris" is, for example, a value most frequently used as the value of "Iris" in the state information. The normal value of "Iso" is, for example, a value most frequently used as the value of "Iso" in the state information. The normal value of "Shutter" is, for example, a value most frequently used as the value of "Shutter" in the state information. The normal values of "Iris", "Iso", and "Shutter" may be predetermined.

Figure 9B:
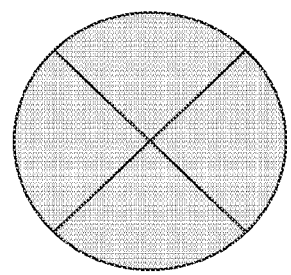
FIG. 9B is a diagram illustrating an example of an icon indicating an imaging apparatus displayed on a UI image.
Figure 10:
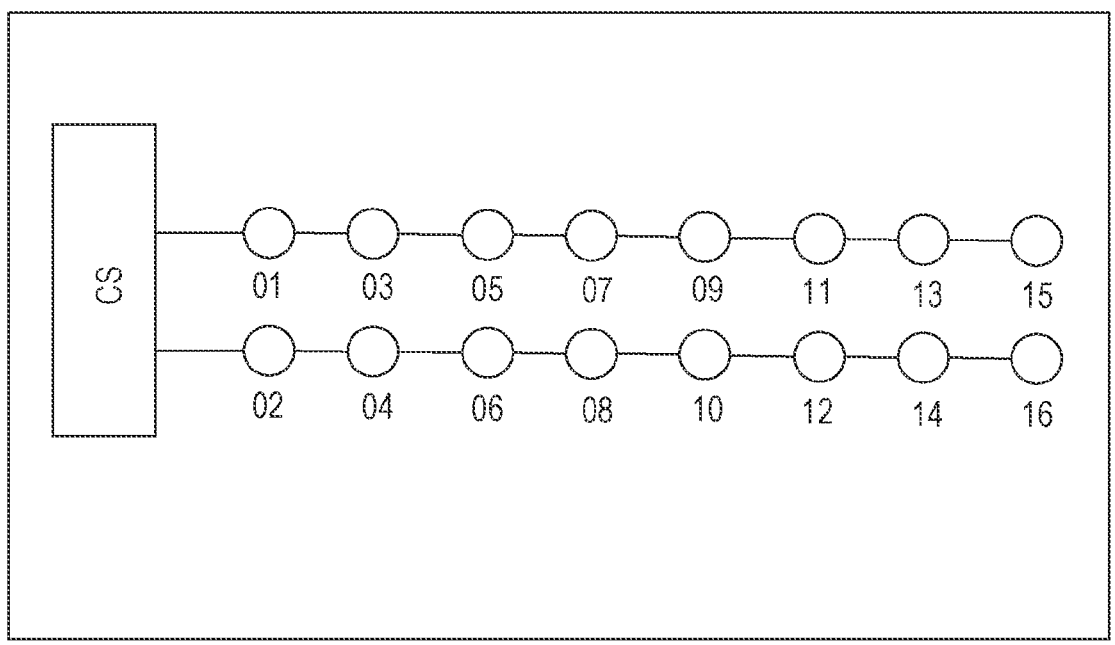
FIG. 10 is a diagram illustrating an example of an interconnection indication UI image.

In S804, the UI image generation unit 503 draws an abnormal icon shown in FIG. 9B as an icon representing the imaging apparatus 100-x selected in S803 at the position determined in S802.

In S805, the UI image generation unit 503 draws a normal icon shown in FIG. 9A as an icon representing the imaging apparatus 100-x selected in S803 at the position determined in S802.

In S806, the UI image generation unit 503 determines whether or not drawing of an icon is completed for all imaging apparatuses 100-x included in the imaging apparatus group 100. In a case where the UI image generation unit 503 determines that icons have be drawn for all the imaging apparatuses 100-x, the process proceeds to S807, but otherwise, the process returns to S803.

In S807, the UI image generation unit 503 draws identification information. More specifically, the UI image generation unit 503 detects the item "Dev" of the shooting environment information, and draws the identification information of the information display apparatus 300 in the rectangle drawn in S801. The UI image generation unit 503 draws the identification information of the imaging apparatuses 100-x included in the imaging apparatus group 100 under the icons drawn in S804 and S805.

In S808, the UI image generation unit 503 connects rectangles or icons representing apparatuses connected by a transmission cable by lines based on the connection destination information in the imaging environment information. More specifically, the UI image generation unit 503 connects the rectangle indicating the information display apparatus 300 and the icon indicating the imaging apparatus 300-x connected to the information display imaging apparatuses 100-x via the transmission cable by lines based on the connection destination information in the photographing environment information. In addition, the UI image generation unit 503 connects icons indicating the imaging apparatuses 100-x, which are connected to each other by the transmission cables, by lines based on the connection destination information in the imaging environment information. FIG. 10 shows an example of an interconnection indication UI image generated by the UI image generation unit 503 by drawing in the steps of the process described above with reference to FIG. 8. The UI image generation unit 503 performs control such that the generated interconnection indication UI image is displayed on the display apparatus 311.

(Parameter Indication UI Image)

Figure 11:
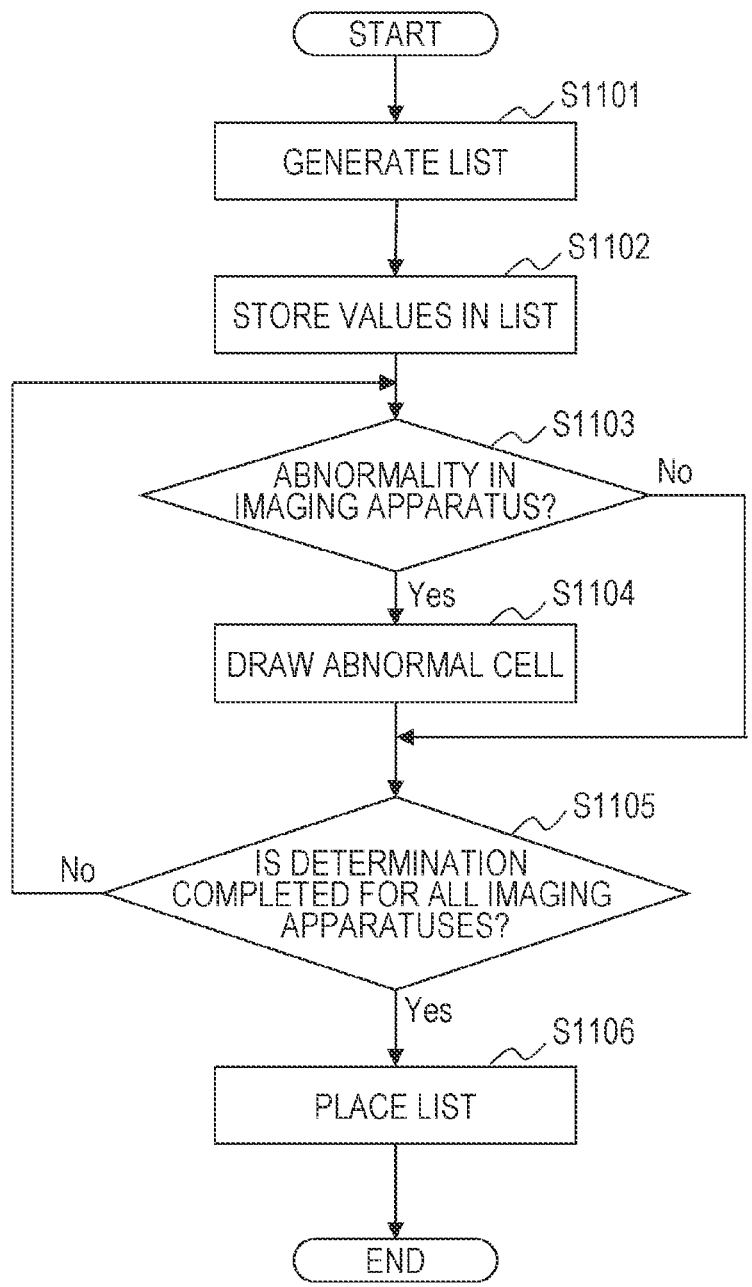
FIG. 11 is a flowchart illustrating an example of a process of generating a parameter indication UI image.

Next, a process of generating a parameter indication UI image and an example of a parameter indication UI image are described. FIG. 11 is a flowchart illustrating an example of a parameter indication UI image generation process that is a process of generating a parameter indication UI image. The parameter indication UI image generation process in FIG. 11 is executed when the UI image generation unit 503 acquires the parameter indication as the UI image type from the control unit 505 in the process in FIG. 7. The order of executing the processing steps of the parameter indication UI image generation process is not limited to the order shown in FIG. 11. FIG. 12 shows an example of a parameter indication UI image.

In S1101, the UI image generation unit 503 generates a list for indicating exposure information and state information related to all imaging apparatuses 100-x. The list generated by the UI image generation unit 503 includes as many rows as there are imaging apparatuses detected from the imaging environment information, and the list includes columns of "Dev", "Iso", "Iris", "Shutter", and "State".

In S1102, the UI image generation unit 503 stores values in the list generated in S1101 based on the imaging environment information and the state information. The UI image generation unit 503 determines "Dev" in the list representing identification information based on "Dev" described in the imaging environment information acquired from the data inputting/reading unit 502. Furthermore, the UI image generation unit 503 determines "Iso", "Iris", "Shutter", and "State" indicating the state in the list based on the state information acquired from the state acquisition unit 504.

In S1103, the UI image generation unit 503 selects one imaging apparatus 100-x for which the determination as to whether it is in an abnormal state has yet not been performed in S1103 after the start of the process in FIG. 11. The UI image generation unit 503 then determines whether or not the selected imaging apparatus 100-x is in an abnormal state based on the state information acquired from the state acquisition unit 504. In a case where the UI image generation unit 503 determines that the selected imaging apparatus 100-x is in an abnormal state described above in S803, the UI image generation unit 503 advances the process to S1104. However, in a case where it is determined that the selected imaging apparatus 100-x is not in an abnormal state, the UI image generation unit 503 advances the process to S1105.

In S1104, the UI image generation unit 503 sets the row of the list indicating the imaging apparatus 100-x selected in S1103 as an abnormal cell. For example, the UI image generation unit 503 fills, with red color, each cell in the row of the list indicating the imaging apparatus 100-x selected in S1103.

In a case where the UI image generation unit 503 determines in S1105 that the determination in S1103 as to the existence of an abnormal state has been performed for all imaging apparatuses 100-x included in the imaging apparatus group 100, the process proceeds to S1106, but otherwise the process returns to S1103.

In step S1106, the UI image generation unit 503 determines a position of the list in the parameter indication UI image.

FIG. 12 shows an example of a parameter indication UI image generated by the UI image generation unit 503 via the process described above with reference to FIG. 11.

The UI image generation unit 503 performs control such that the generated parameter indication UI image is displayed on the display apparatus 311.

(Actual Position Indication UI Image)

Figure 13:
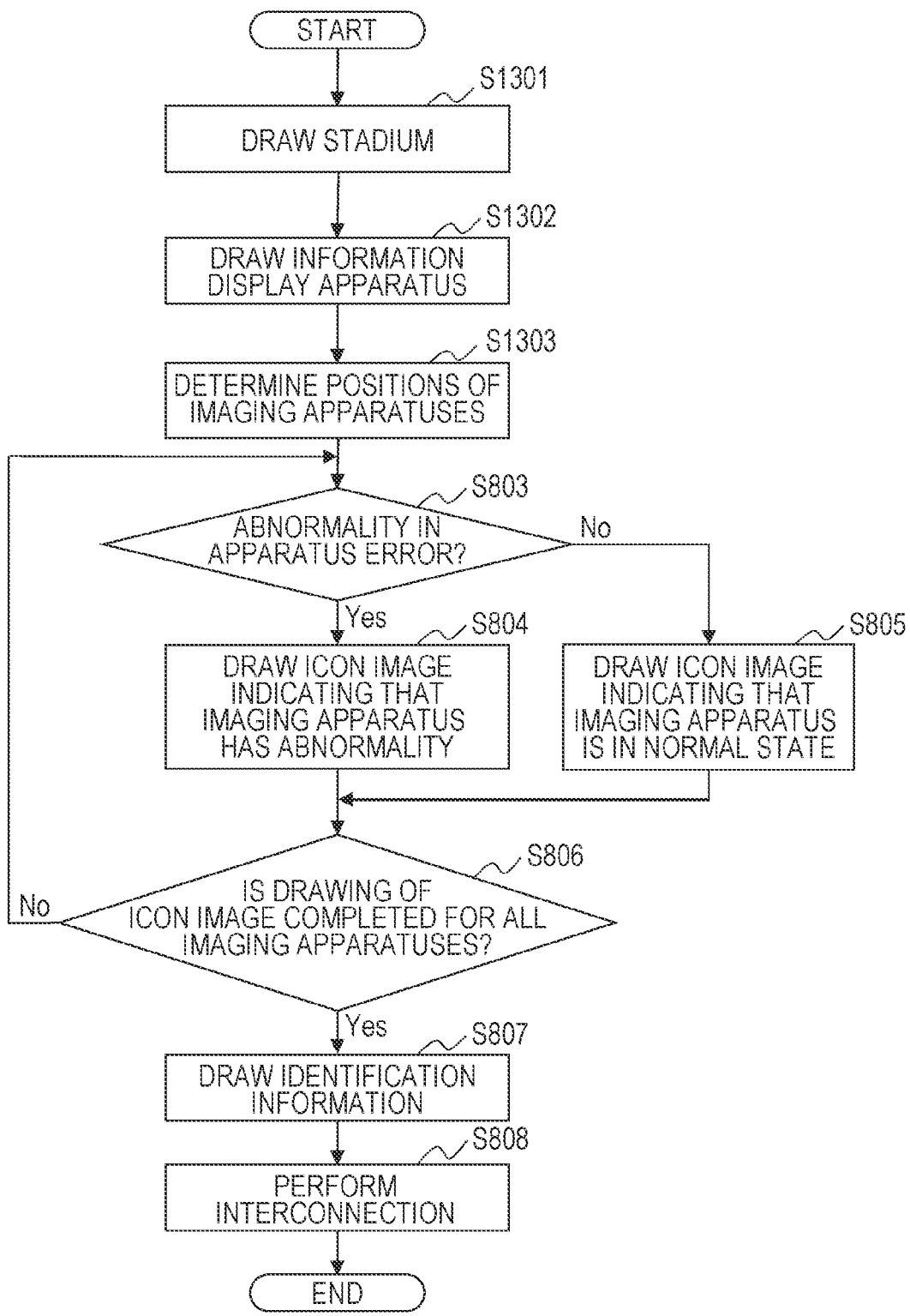
FIG. 13 is a flowchart illustrating an example of a process of generating an actual position indication UI image.
Figure 14:
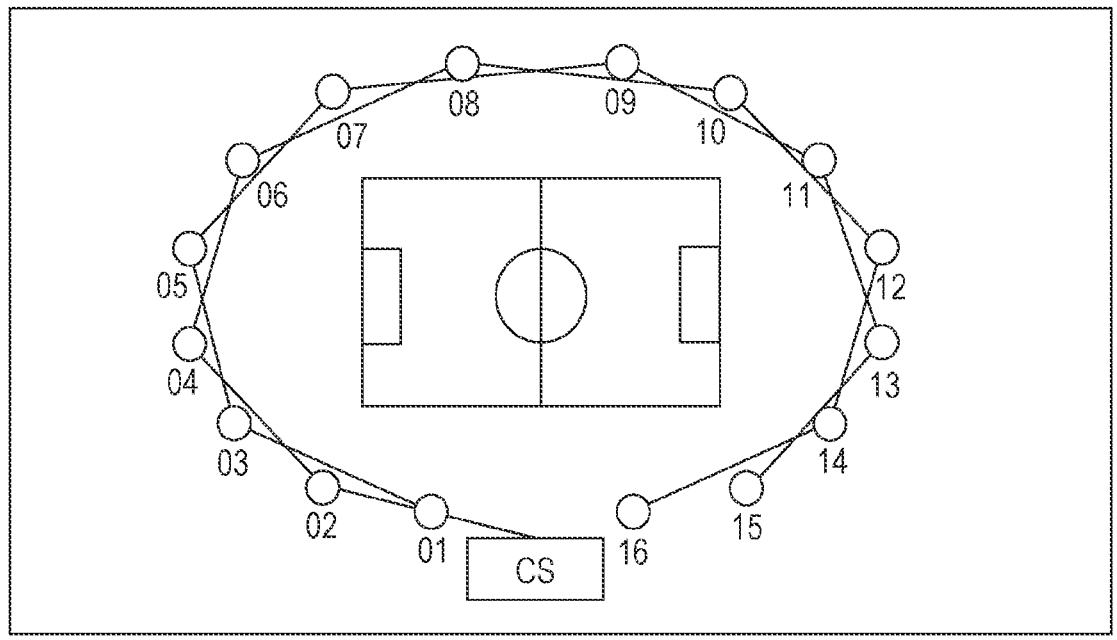
FIG. 14 is a diagram illustrating an example of an actual position indication UI image.

Next, a process of generating an actual position indication UI image and an example of an actual position indication UI image are described. FIG. 13 is a flowchart illustrating an example of an actual position indication UI image generation process, which is a process of generating an actual position indication UI image. The actual position indication UI image generation process in FIG. 13 is executed when the UI image generation unit 503 acquires the actual position indication as the UI image type from the control unit 505 in the process in FIG. 7. The order of executing processing steps in the actual position indication UI image generation process is not limited to the order illustrated in FIG. 13. FIG. 14 illustrates an example of an actual position indication UI image.

In step S1301, the UI image generation unit 503 performs drawing according to layout data of the stadium 210 acquired from the data inputting/reading unit 502.

In step S1302, the UI image generation unit 503 determines the position of the information display apparatus 300 based on the XYZ-information in the imaging environment information acquired from the data-inputting/reading unit 502, and draws the information display apparatus 300 in the stadium 210.

In step S1303, the UI image generation unit 503 determines the position of each imaging apparatus 100-x included in the imaging apparatus group 100 in the actual position indication UI image based on the XYZ-information in the imaging environment information acquired from the data-inputting/reading unit 502.

S803 to S808 in FIG. 13 are similar to S803 to S808 in FIG. 8. However, in S804 and S805 in FIG. 13, the positions of the imaging apparatuses 100-x are given by the positions determined in S1303.

FIG. 14 shows an example of an actual position indication UI image generated by the UI image generation unit 503 via the drawing process described above with reference to FIG. 13. The UI image generation unit 503 performs control such that the generated actual position indication UI image is displayed on the display apparatus 311.

The processes shown in FIG. 8, FIG. 11, and FIG. 13 in which the UI image generation unit 503 performs control such that UI images are displayed on the display apparatus 311 are each an example of a display control process. The display control process is a process of performing control such that states of a plurality of imaging apparatuses 100-x are displayed based on the state information and the UI image type determined in FIG. 7. In the display control process according to the present embodiment, the UI image generation unit 503 performs control such that states of a plurality of imaging apparatuses 100-x using an image of the UI image type determined in the process in FIG. 7 based on the state information.

(Effects of Switching Displayed UI Depending on Abnormality)

Next, effects of switching a displayed UI image depending on abnormality of an imaging apparatus 100-x are described. FIG. 15 shows an example of state information when an abnormality occurs. In the example in FIG. 15, the state information acquired by the state acquisition unit 504 indicates that a network error occurs in each of the imaging apparatuses 100-11, 100-13, and 100-15. Note that in the present embodiment, as shown in the imaging environment information in FIG. 5, the imaging apparatuses 100-x are chain-connected to the network cable. Therefore, the abnormality detected in the imaging apparatus 100-13 and the abnormality detected in the imaging apparatus 100-15 are due to the abnormality of the imaging apparatus 100-11. Thus, the imaging apparatus 100-11 is an apparatus that is to be dealt with.

Figure 16:
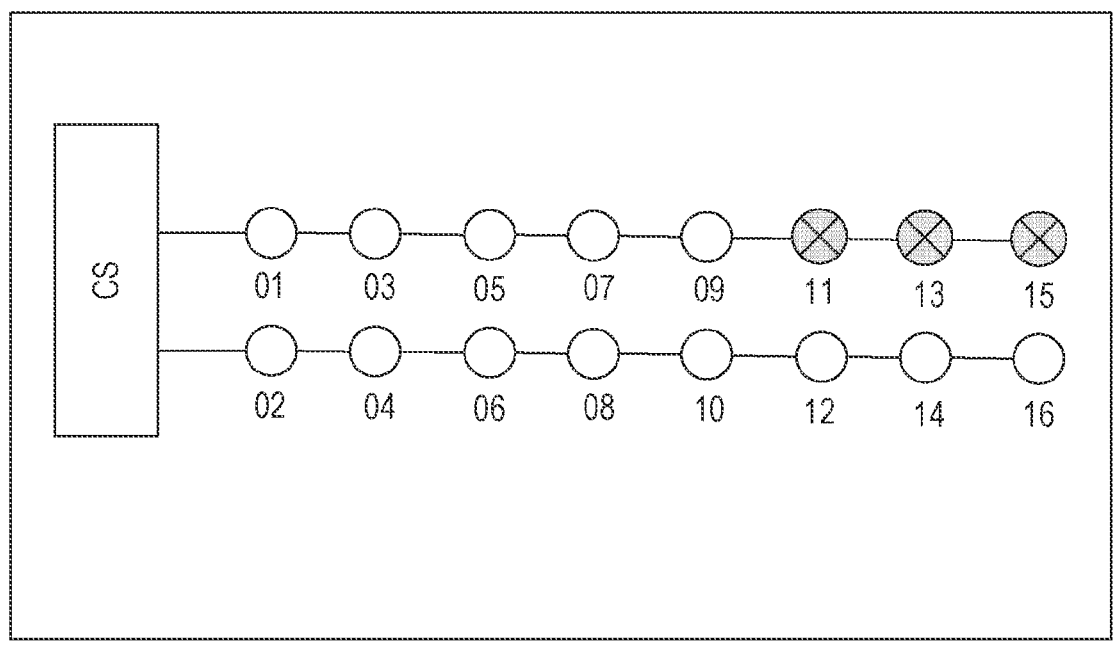
FIG. 16 is a diagram illustrating an example of an interconnection indication UI image.
Figure 18:
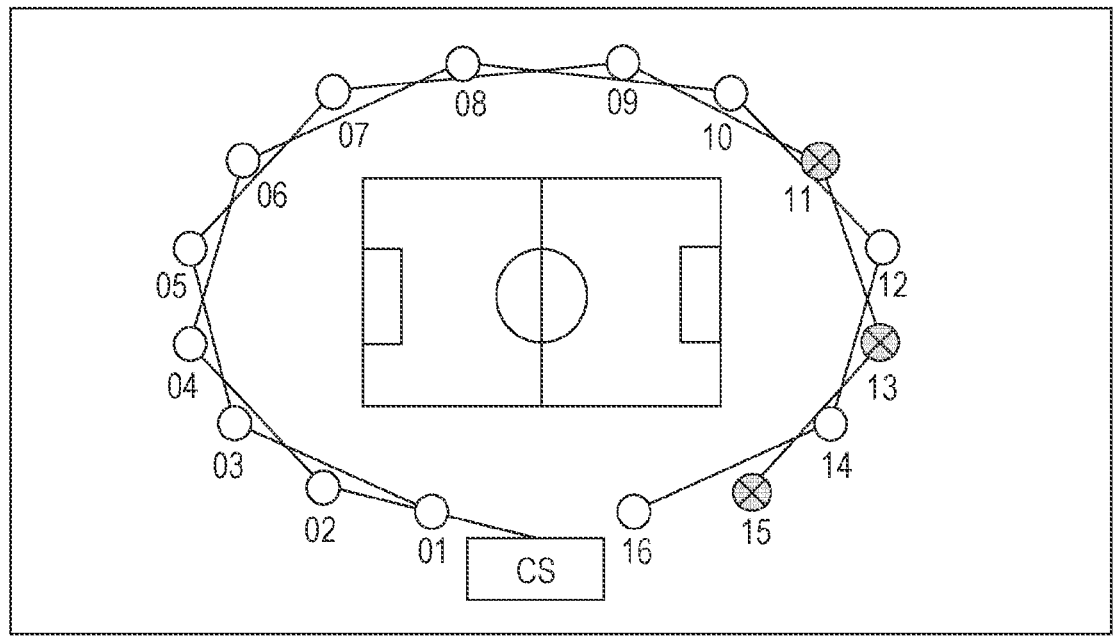
FIG. 18 is a diagram illustrating an example of an actual position indication UI image.

FIG. 16 shows an example of an interconnection indication UI image displayed in a case where state information is such as that shown in FIG. 15. FIG. 17 shows an example of a parameter indication UI image in a case where the state information is such as that shown in FIG. 15. FIG. 18 shows an example of an actual position indication UI image in a case where the state information is such as that shown in FIG. 15.

The interconnection indication UI image in FIG. 16 allows a system supervisor to recognize the chain network connection at a glance. Furthermore, in the interconnection indication UI image in FIG. 16, apparatuses at successive positions at an end of the network are in error sates. Therefore, the system supervisor can immediately understand that the abnormality in the imaging apparatus 100-11 causes the errors. The parameter indication UI image shown in FIG. 17 allows the system supervisor to detect an occurrence of a network error. However, since information on the connection configuration is not provided, it is impossible to identify an imaging apparatus 100-*x* that causes the abnormality. The actual position indication UI image in FIG. 18 allows the system supervisor to identify the imaging apparatus 100-*x* that causes the abnormality by confirming the connection, but the confirmation work of tracing the connection is troublesome, and the possibility of making a wrong determination is high compared with the case using the interconnection indication UI image.

In this embodiment, when a network error occurs, an interconnection indication UI image such as that shown in FIG. 16 is displayed on the display apparatus 311. Therefore, the system supervisor can identify an erroneous imaging apparatus 100-*x* accurately in a short time.

Next, a description is further given below for a case where an exposure abnormality occurs in an imaging apparatus 100-*x*.

The information display apparatus 300 has a capability of changing exposure settings of imaging apparatuses 100-*x*. More specifically, first, the user input unit 506 of the information display apparatus 300 accepts information on an imaging apparatus 100-*x* designated by the system supervisor or the like and a setting value in terms of exposure for this imaging apparatus 100-*x*. Next, the control signal output unit 507 transmits a control signal based on the accepted setting value to the designated imaging apparatus 100-*x*. Thus, the information display apparatus 300 can change the exposure setting of the imaging apparatus 100-*x*.

Therefore, when the exposure of the imaging apparatus 100-*x* is abnormal, to quickly solve the abnormal exposure, it is necessary to identify the abnormal imaging apparatus 100-*x* and detect the correct set values of Iso, Iris, and Shutter in a short time. For this purpose, a parameter indication UI image such as that shown in FIG. 17 is suitable as a UI image.

In the present embodiment, when an exposure abnormality occurs, a parameter indication UI image such that shown in FIG. 17 is displayed on the display apparatus 311. Thus, the system supervisor can quickly identify the erroneous imaging apparatus 100-*x* and can immediately change the exposure setting.

Finally, a description is given below for a case where vibration of the imaging apparatus 100-*x* is detected and a case where an obstacle is detected in a captured image captured by an imaging apparatus 100-*x*. Examples of factors of the vibration include loosening of a portion (for example, a screw) by which the imaging apparatus 100-*x* is fixed, instability of a scaffold, and a presence of a vibrating object at a nearby location. For example, an obstacle in a captured image occurs when an image of a body of a spectator present in front of an imaging apparatus 100-*x* is captured by the imaging apparatus 100-*x*. Another example of the cause of the obstacle in a captured image is an object placed or an object flying such as an insect. To resolve these abnormalities, it is necessary for an operator to go to a place of the imaging apparatus 100-*x* having the detected abnormality to manually deal with the abnormality. Therefore, when vibration of an imaging apparatus 100-*x* is detected or when an obstacle is detected in a captured image captured by an imaging apparatus 100-*x*, it is desirable to display a UI image that allows the supervisor to understand an actual location of the imaging apparatus 100-*x* in a short time. An actual position indication UI image such as that shown in FIG. 18 meets this object.

In the present embodiment, when vibration of an imaging apparatus 100-*x* is detected or when an obstacle is detected in an image captured by an imaging apparatus 100-*x*, an actual position indication UI image such as that shown in FIG. 18 is displayed on the display apparatus 311. This allows the system supervisor to quickly know the actual location of the abnormal imaging apparatus 100-*x* and to efficiently deal with it.

In the present embodiment, as described above, the information display apparatus 300 is capable of appropriately displaying states of a plurality of imaging apparatuses 100-*x* by displaying a UI image depending on a content of an abnormality of an imaging apparatus 100-*x*. The system supervisor or the like can quickly identify an apparats having an abnormality, a content of the abnormality, and an influence range of the abnormality, and quickly take appropriate measures against the abnormality. The present embodiment has been described above with the reference to the example in which one UI image type is determined according to the content of the abnormality. However, a plurality of UI image types may be determined based on the state information as necessary.

Second Embodiment

Next, a second embodiment is described. In this second embodiment, an example is described below for a case where a displayed UI image is switched in accordance with a progress of a workflow from installation of imaging apparatuses 100-*x* to imaging. According to the present embodiment, a UI suitable for executing the workflow is displayed that makes it possible to efficiently perform the work.

In the present embodiment, the workflow represents a process of enabling a plurality of imaging apparatuses 100-*x* to be used in an imaging system. More specifically, the workflow according to the present embodiment represents a procedure from installation of all imaging apparatuses 100-*x* to achieving a state in which all the imaging apparatuses 100-*x* are ready to perform imaging normally. There are four states in the progress of the work in the workflow, and the state transitions in the order of the state number. The four states are as follows.
1. Network checking state
2. Installation checking state
3. Exposure checking state
4. Imaging enabled state The network checking state is a state in which an operation is being performed to establish a network correction of the information display apparatus 300 and the imaging apparatuses 100-*x* are being network-connected. In the network checking state, the information display apparatus 300 checks whether or not the information display apparatus 300 and all the imaging apparatuses 100-*x* have been network-connected, as will be described later. When it is confirmed that the network connection of the information display apparatus 300 and all the imaging apparatuses 100-*x* has been established, the progress state of the workflow transitions to the installation checking state. The network checking state is an example of the first state in the workflow from the installation of the plurality of imaging apparatuses 100-*x* until the normal network connection of the imaging apparatuses 100-*x* is achieved.

The installation checking state is a state in which an operation is being performed to adjust the direction and the angle of view of the imaging apparatus 100-*x* and an operation is being performed to achieve a state in which there is no obstacle in captured images. For example, in the installation checking state, an operation is performed to adjust the direction of the imaging apparatus 100-*x* such that an imaging target is located at the center of a captured image, and an operation is performed to adjust the zoom and focus, and an operation is performed to remove an obstacle. In the installation checking state, the operation to adjust the imaging apparatuses 100-x is performed manually. In the installation checking state, the information display apparatus 300 checks whether or not the operation in the installation checking state is completed, as will be described later. When it is confirmed that the operation in the installation checking state is completed, the progress state of the workflow transitions to the exposure checking state. The installation checking state is an example of the second state from when the normal network connection of the plurality of imaging apparatuses 100-x is achieved to when the normal installation of the plurality of imaging apparatuses 100-x is achieved.

The exposure checking state is a state in which an operation is being performed to equally set exposure setting values to all imaging apparatuses 100-x. In the exposure checking state, the information display apparatus 300 checks whether or not the exposure setting values have been set equally for all imaging apparatuses 100-x, as will be described later. More specifically, the exposure setting values are values of Iso, Iris, and Shutter. When it is confirmed that the exposure setting values have been set equally for all the imaging apparatuses 100-x, the progress state of the workflow transitions to the imaging-enabled state. The exposure checking state is an example of the third state from after the plurality of imaging apparatuses 100-x are normally installed until the imaging parameters of the plurality of imaging apparatuses 100-x are normally set.

The imaging-enabled state is a state in which the imaging system is in the imaging enabled state. In the imaging-enabled state, the image generation apparatus 200 is capable of generating a virtual viewpoint image based on the images imaged by the imaging apparatuses 100-x. The imaging-enabled state is an example of the fourth state in which the imaging parameters of the plurality of imaging apparatuses 100-x are normal and the plurality of imaging apparatuses 100-x are capable of imaging.

In the following description of the second embodiment, constituent element/processes similar to those described above in the first embodiment are omitted, and constituent element/processes different from the first embodiment are described. In the description of the second embodiment, constituent elements similar to those of the first embodiment are denoted by similar reference numerals as those of the first embodiment, and a further detailed description thereof will be omitted.

Figure 19:
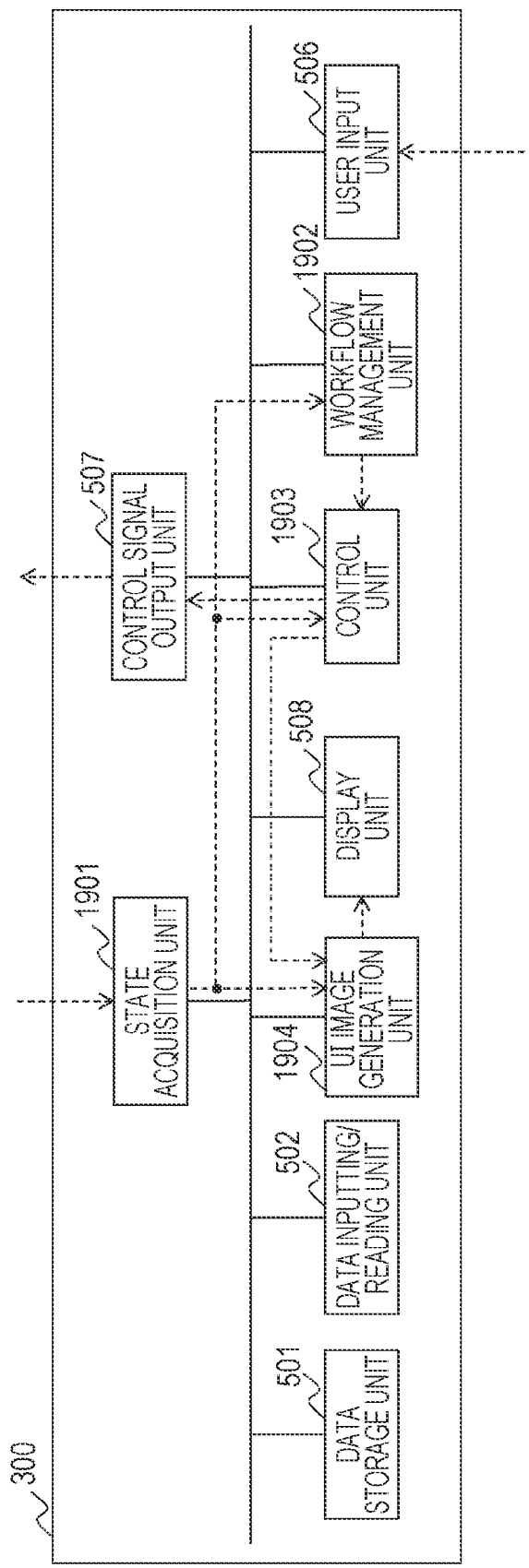
FIG. 19 is a diagram illustrating an example of a functional configuration of an information display apparatus.

FIG. 19 is a diagram showing an example of a functional configuration of the information display apparatus 300 according to the second embodiment. The information display apparatus 300 includes a data storage unit 501, a data inputting/reading unit 502, a workflow management unit 1902, a UI image generation unit 1904, a state acquisition unit 1901, a control unit 1903, a user input unit 506, a control signal output unit 507, and a display unit 508. These units can transmit and receive data to and from each other under the control of the control unit 1903. The workflow management unit 1902, the control unit 1903, and the UI image generation unit 1904 in FIG. 19 correspond to the CPU 302 in FIG. 3. The state acquisition unit 1901 in FIG. 19 corresponds to the communication I/F 308 in FIG. 3. An example of a configuration of each unit is described in detail below.

The state acquisition unit 1901 acquires the state information of the imaging apparatuses 100-x included in the imaging apparatus group 100, and outputs the acquired state information to the workflow management unit 1902, the UI image generation unit 1904, and the control unit 1903.

The workflow management unit 1902 manages the progress state of the workflow based on the state information acquired from the state acquisition unit 1901, and outputs the workflow information to the control unit 1903 when the progress state of the workflow is updated.

The control unit 1903 determines a UI image type based on the progress state of the workflow acquired from the workflow management unit 1902, and outputs UI image type information to the UI image generation unit 1904.

The UI image generation unit 1904 generates a UI image for use in monitoring the imaging apparatuses 100-x based on the UI image type information acquired from the control unit 1903 and the state information acquired from the state acquisition unit 504. The UI image generation unit 503 outputs the generated UI image as a display image to the display unit 508, and displays the UI image on the display apparatus 311.

Figure 20:
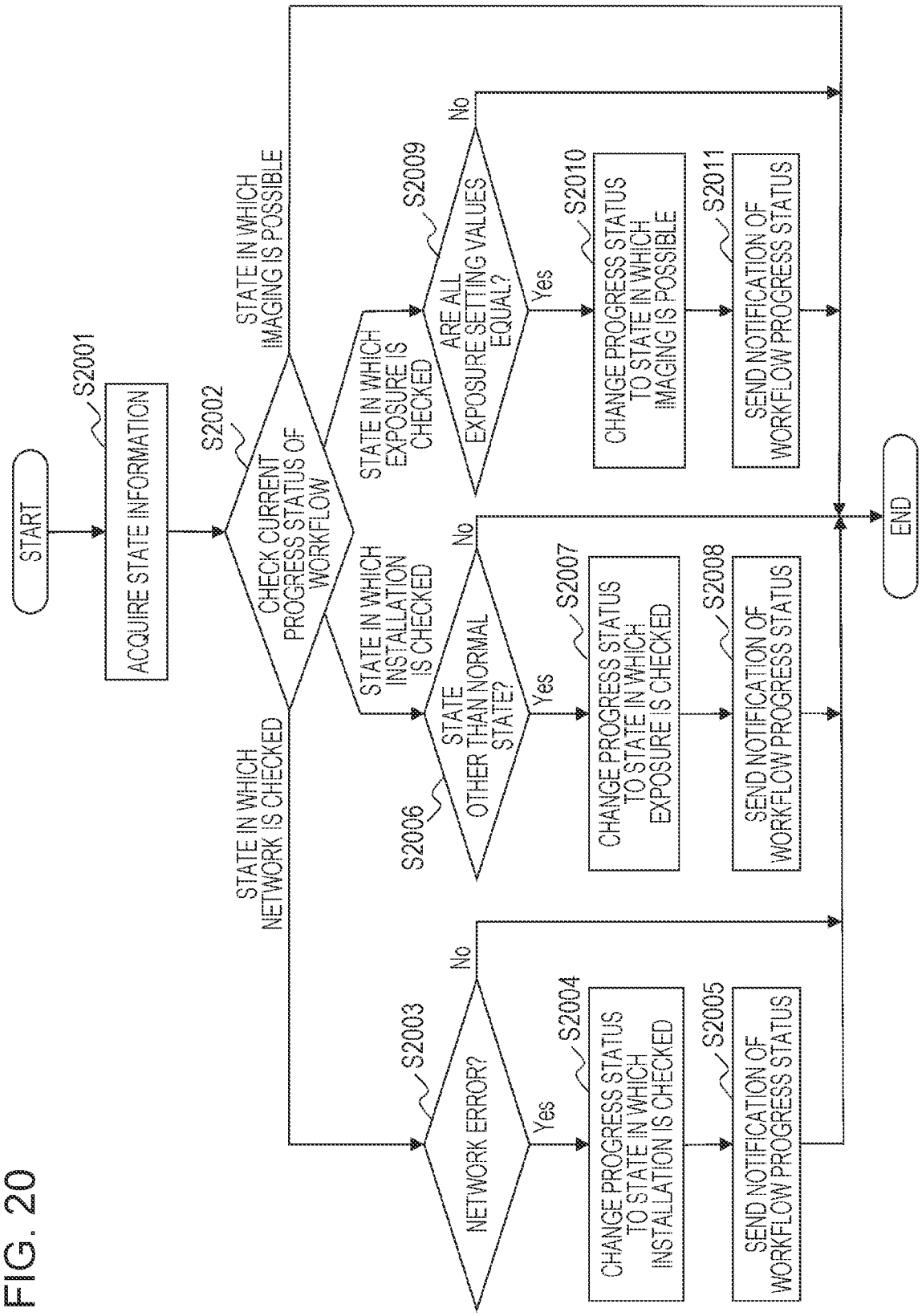
FIG. 20 is a flowchart illustrating an example of a state identifying process.

FIG. 20 is a flowchart illustrating an example of a state determination process in which the workflow management unit 1902 determines the progress state of the workflow based on the state information acquired from the state acquisition unit 1901. The state determination process is an example of the second determination process.

In S2001, the workflow management unit 1902 acquires the state information from the state acquisition unit 1901.

In step S2002, the workflow management unit 1902 checks the current progress state of the workflow stored in the HDD 305 or the RAM 304. In a case where it is determined that the current progress state of the workflow is the network checking state, the workflow management unit 1902 advances the process to S2003. In a case where it is determined that the current progress state of the workflow is the installation checking state, the workflow management unit 1902 advances the process to S2006. In a case where it is determined that the current progress state of the workflow is the exposure checking state, the workflow management unit 1902 advances the process to S2009. In a case where it is determined that the current progress state of the workflow is the imaging-enabled state, the workflow management unit 1902 ends the process in FIG. 20.

In S2003, the workflow management unit 1902 determines whether or not there is an imaging apparatus 100-x having a network error based on the state information acquired in S2001. More specifically, the workflow management unit 1902 determines whether or not there is an imaging apparatus 100-x for which the item "State" of the state information shown in FIG. 6 is "NwErr". In a case where the workflow management unit 1902 determines that there is an imaging apparatus 100-x having a network error, the workflow management unit 1902 advances the process to S2004. In a case where the workflow management unit 1902 determines that there is no imaging apparatus 100-x having a network error, the workflow management unit ends the process in FIG. 20.

In S2004, the workflow management unit 1902 determines that the progress state of the workflow is the installation checking state. The workflow management unit 1902 then changes the progress state of the workflow to the installation checking state, and stores the changed state in the HDD 305 or the RAM 304.

In S2005, the workflow management unit 1902 notifies the control unit 1903 of information indicating that the progress state of the workflow is the installation checking state. Thereafter, the workflow management unit 1902 ends the process of FIG. 20.

In S2006, the workflow management unit 1902 determines, based on the state information acquired in S2001, whether or not there is an imaging apparatus 100-*x* for which the item "State" of the state information is other than "Normal". In a case where the workflow management unit 1902 determines that there is an imaging apparatus 100-*x* whose "State" is other than "Normal", the workflow management unit 1902 advances the process to S2007. In a case where the workflow management unit 1902 determines that there is no imaging apparatus 100-*x* whose "State" is other than "Normal", workflow management unit 1902 ends the process in FIG. 20.

In S2007, the workflow management unit 1902 determines that the progress state of the workflow is the exposure checking state. Then, the workflow management unit 1902 changes the progress state of the workflow to the exposure checking state, and stores the changed state in the HDD 305 or the RAM 304.

In S2008, the workflow management unit 1902 notifies the control unit 1903 of information indicating that the progress state of the workflow is the exposure checking state. Thereafter, the workflow management unit 1902 ends the process of FIG. 20.

In step S2009, the workflow management unit 1902 determines whether or not the exposure setting values are set equally for all the imaging apparatuses 100-*x* included in the imaging apparatus group 100 based on the state information acquired in step S2001. More specifically, in a case where the setting values in terms of "Iso", "Iris", and "Shutter" shown in FIG. 6 are equal to those set to each of the imaging apparatuses 100-*x* for all the imaging apparatuses 100-*x*, the workflow management unit 1902 determines that the exposure setting values are equally set for all the imaging apparatus 100-*x* included in the imaging apparatus group 100. In a case where the workflow management unit 1902 determines that the exposure setting values are equally set for all the imaging apparatus 100-*x* included in the imaging apparatus group 100, the workflow management unit 1902 advances the process to S2010, but otherwise, the workflow management unit 1902 ends the process in FIG. 20.

In step S2010, the workflow management unit 1902 determines that the progress state of the workflow is the imaging-enabled state. Then, the workflow management unit 1902 changes the progress state of the workflow to the imaging-enabled state, and stores the changed state in the HDD 305 or the RAM 304. The processes in S2004, S2007, and S2010 are examples of the determination process of determining the progress state of the workflow.

In step S2011, the workflow management unit 1902 notifies the control unit 1903 of information indicating that the progress state of the workflow is the imaging-enabled state. Thereafter, the workflow management unit 1902 ends the process of FIG. 20.

(Method of Determining UI Image Type Depending on Workflow)

Figure 21:
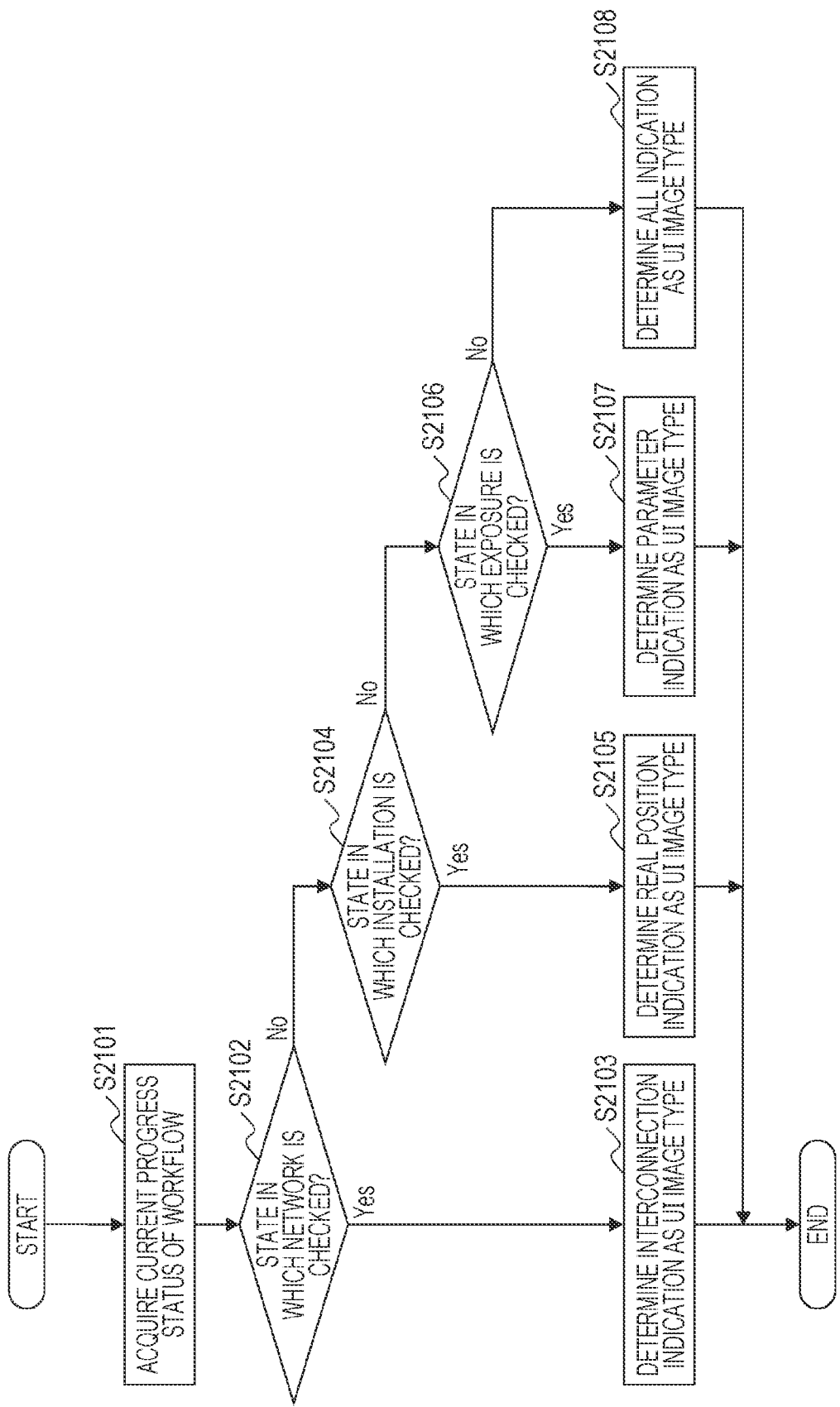
FIG. 21 is a flowchart illustrating an example of a UI image type determination process.

FIG. 21 is a flowchart illustrating an example of UI image type determination process in which the control unit 1903 determines a UI image type based on workflow information acquired from the workflow management unit 1902.

In S2101, the control unit 1903 acquires the current progress state of the workflow from the workflow management unit 1902.

In S2102, the control unit 1903 determines whether or not the current progress state of the workflow is the network checking state. In a case where it is determined that the current progress state is the network checking state, the control unit 1903 advances the process to S2103. However, in a case where it is determined that the current progress state is not the network checking state, the control unit 1903 advances the process to S2104.

In S2103, the control unit 1903 selects the interconnection indication from the plurality of UI image types, and determines that the UI image type to be used for the UI image is the interconnection indication. Then, the control unit 1903 outputs information indicating the interconnection indication to the UI image generation unit 503. Thereafter, the control unit 1903 ends the process in FIG. 21.

In S2104, the control unit 1903 determines whether or not the current progress state of the workflow is the installation checking state. In a case where it is determined that the current progress state is the installation checking state, the control unit 1903 advances the process to S2105. In a case where it is determined that the current progress state is not the installation checking state, the control unit 1903 advances the process to S2106.

In S2105, the control unit 1903 selects the actual position indication from the plurality of UI image types, and determines that the UI image type to be used for the UI image is the actual position indication. Then, the control unit 1903 outputs information indicating the actual position indication to the UI image generation unit 503. Thereafter, the control unit 1903 ends the process in FIG. 21.

In S2106, the control unit 1903 determines whether or not the current progress state of the workflow is the exposure checking state. In a case where it is determined that the current progress state is the exposure checking state, control unit 1903 advances the process to S2107. In a case where it is determined that the current progress state is not the exposure checking state, control unit 1903 advances the process to S2108.

In S2107, the control unit 1903 selects the parameter indication from the plurality of UI image types, and determines that the UI image type to be used for the UI image is the parameter indication. Then, the control unit 1903 outputs information indicating the parameter indication to the UI image generation unit 503. Thereafter, the control unit 1903 ends the process in FIG. 21.

In S2108, the control unit 1903 selects all of the UI image types from the plurality of UI image types, and determines that the UI image type to be used for the UI image is all indication. The all indication is an image type in which three UI images of interconnection indication, parameter indication, and actual position indication are displayed on one screen. S2108 is executed when the state is the image-enabled state. This UI display allows the system supervisor to comprehensively view all information. Thereafter, the control unit 1903 ends the process in FIG. 21.

The process in FIG. 21 is an example of the first determination process of determining one of the plurality of UI image types based on the progress state determined in the process in FIG. 20.

The UI image generation unit 1904 generates a UI image based on the UI image type acquired from the control unit 1903 as in the first embodiment. In a case where the UI image type is the all indication, the UI image generation unit 1904 generates a UI image including an interconnection indication UI image, a parameter indication UI image, and an actual position indication UI image on one screen. Then, the UI image generation unit 503 performs control such that the generated UI image is displayed on the display apparatus 311.

In the present embodiment, as described above, the information display apparatus 300 is capable of appropriately displaying the states of the plurality of imaging apparatuses 100-*x* by displaying the UI image depending on the progress state of the workflow of the imaging system. Therefore, the operator can efficiently perform the operation until achieving the state in which imaging can be started.

Third Embodiment

Next, a third embodiment is described below. In this third embodiment, a description is given as to an example in which a state of an imaging system is comprehensively displayed, and a content relating to an abnormality of an apparatus is displayed preferentially in an emphasized manner. According to the third embodiment, the system supervisor can comprehensively monitor the entire imaging system and can quickly understand which apparatus has an abnormality, the content of the abnormality, and the influence range of the abnormality.

In the following description of the third embodiment, constituent elements/processes similar to those in the first embodiment are omitted, and constituent elements/processes different from constituent elements/processes in the first embodiment are described. Furthermore, in the description of the third embodiment, similar constituent elements to those in the first embodiment are denoted by reference numerals similar to those in the first embodiment, and detailed descriptions thereof are omitted.

In this embodiment, the information display apparatus 300 has a simultaneous UI image display function, and has a function of switching ON/OFF of the simultaneous UI image display in accordance with an operation performed by a system supervisor. In a case where the simultaneous UI image display is ON, three UI images, that is, the interconnection indication UI image, the actual position indication UI image, and the parameter indication UI image are displayed on one screen. In a case where the simultaneous UI image display is OFF, one of the interconnection indication UI image, the actual position indication UI image, and the parameter indication UI image is displayed in a similar manner as in the first embodiment. The method of displaying the UI image when the simultaneous UI image display is ON is an example of the first display-method. The method of displaying the UI image when the simultaneous UI image display is OFF is an example of the second display-method.

The control unit 505 switches ON/OFF of the simultaneous UI image display in accordance with operation information given via the user input unit 506. The process in which the control unit 505 receives the ON or OFF of the UI image simultaneous display via the user input unit 506 is an example of the acceptance process.

The UI image generation unit 503 has a function of displaying three UI images, that is, the interconnection indication UI image, the actual position indication UI image, and the parameter indication UI image on one screen, and also a function of changing the sizes of the UI images displayed on the screen.

(Switching High-Priority Image Depending on UI Image Type)

The control unit 505 determines the UI image type by performing a process similar to that in FIG. 7 or FIG. 21, and outputs the determined UI image type to the UI image generation unit 503. The UI image generation unit 503 determines the UI image to be displayed with high priority based on the UI image type acquired from the control unit 505, and performs displaying such that the determined UI image is displayed in a larger size than other UI images on the display apparatus 311.

Figure 22:
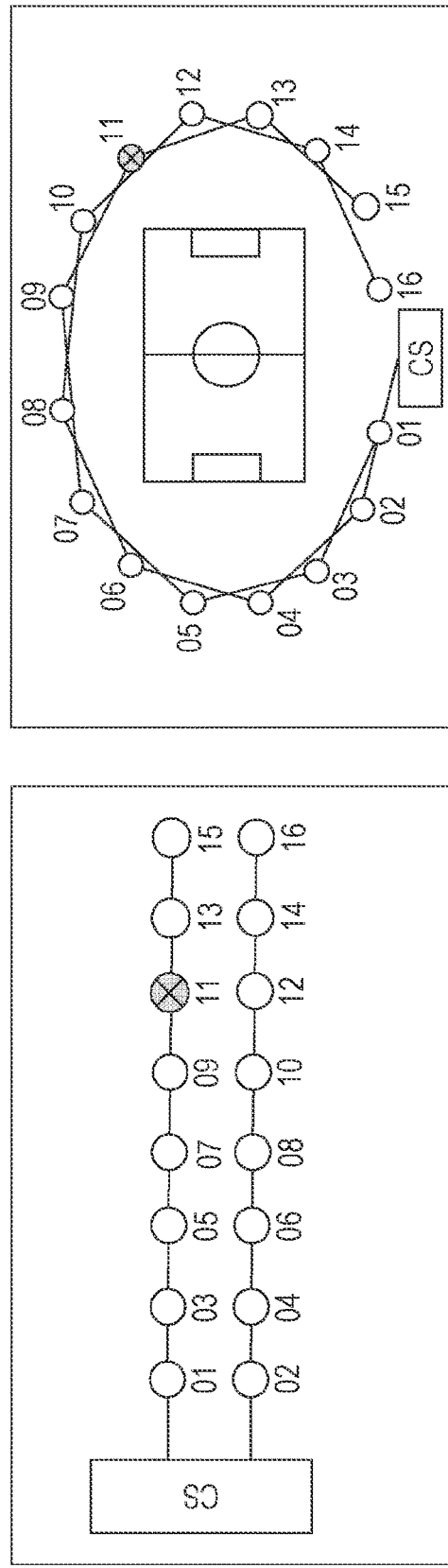
FIG. 22 is a diagram showing an example of a screen displayed on a display apparatus.

FIG. 22 is a diagram showing an example of a screen displayed on the display apparatus 311 in a case where the UI image generation unit 503 acquires the parameter indication as the UI image type from the control unit 505. From the screen such as that shown in FIG. 22, the system supervisor can determine the imaging apparatus 100-*x* to be preferentially subjected to exposure adjustment, and can also understand the position of the imaging apparatus 100-*x*. The screen such as that shown in FIG. 22 is useful, for example, when backlight to an imaging apparatus 100-*x* is so strong that the overexposure cannot be dealt with only by adjusting the exposure. In this case, it is necessary to get to the place of the imaging apparatus 100-*x* to perform an operation such as moving of the installation position of the imaging apparatus 100-*x*, attaching of a filter to a lens, or the like. In this case, it is more efficient if the system supervisor allowed to simultaneously understand the actual position of 100-*x* of the imaging apparatus. Therefore, it is desirable to set the simultaneous UI image display ON by an operation by the system supervisor.

In the present embodiment, as described above, the information display apparatus 300 is capable of appropriately displaying the states of the plurality of imaging apparatuses 100-*x* by comprehensively displaying the states of the imaging system and highlighting the content to be preferentially displayed depending on the content of the abnormality of the apparatus. According to the present embodiment, the system supervisor or the like is allowed to comprehensively monitor the entire imaging system and to quickly identify the apparatus in which the abnormality occurs, the content of the abnormality, and the influence range of the abnormality.

In the third embodiment, the information display apparatus 300 is capable of switching ON/OFF the UI image simultaneous display. However, the information display apparatus 300 may be configured such that the simultaneous display of UI images is always ON. There may be a plurality of types of UI images determined as UI images to be preferentially displayed. The information display apparatus 300 may display all UI images in the same size.

The present disclosure has been described above with reference to embodiments. Note that the embodiments described above are merely examples, and the disclosure is not limited to these embodiments. That is, the present disclosure can be implemented in various forms without departing from the technical idea or main features thereof.

For example, information display apparatus 300 may have a hardware configuration in which there are a plurality of CPUs, and the plurality of CPUs may execute processing according to programs stored in HDDs or the like of the respective apparatuses. In the hardware configuration of the information display apparatus 300, a graphics processing unit (GPU) may be used instead of the CPU. Part of functionality of the information display apparatus 300 may be implemented by hardware of the information display apparatus 300. The above-described embodiments may be arbitrarily combined.

As described above, according to one of the above-described embodiments, it is possible to appropriately display the states of the plurality of imaging apparatuses 100-*x*.

According to the present disclosure, it is possible to appropriately display states of a plurality of imaging apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A display control apparatus comprising:
one or more memories storing instructions; and
one or more processors executing the instructions to:
acquire state information representing states of a plurality of imaging apparatuses;
determine, based on the acquired state information, at least one image type from a plurality of image types representing display formats, the plurality of image types including at least i) an interconnection indication representing a plurality of interconnections between the plurality of imaging apparatuses using lines and ii) a parameter indication by which each imaging parameter for each of the plurality of imaging apparatuses is displayed by a list, the interconnection indication being determined as the image type in a case where an error of a network between the imaging apparatuses occurs, the parameter indication being determined as the image type in a case where an error of a parameter of an imaging apparatus occurs;
generate an image to be displayed based on the acquired state information and the determined image type, the image to be displayed being updated based on detection of a change in the state information; and
perform control for displaying of the generated image.

2. The display control apparatus according to claim 1, wherein the states of the plurality of imaging apparatuses are displayed using an image of the determined image type.

3. The display control apparatus according to claim 1, wherein the control is control of displaying the plurality of imaging apparatuses using the images of the plurality of image types such that the image of the determined image type is larger than the images of the other image types based on the acquired state information.

4. The display control apparatus according to claim 1, wherein the plurality of image types include an image type with a format of displaying a network connection configuration of the plurality of imaging apparatuses.

5. The display control apparatus according to claim 1, wherein the plurality of image types include an image type with a format of displaying a list of imaging parameters of the plurality of imaging apparatuses.

6. The display control apparatus according to claim 1, wherein the plurality of image types include an image type with a format of displaying positions at which the plurality of imaging apparatuses are disposed.

7. The display control apparatus according to claim 1, wherein at least one image type from the plurality of image types is determined based on a type of an error indicated by the acquired state information.

8. The display control apparatus according to claim 1, wherein the one or more processors further executes the instructions to
determine a progress state of a process of enabling the plurality of imaging apparatuses to be used in the imaging system based on the acquired state information,
wherein at least one image type from the plurality of image types is determined based on the determined progress state.

9. The display control apparatus according to claim 1, wherein the state information includes setting values of the plurality of imaging apparatuses.

10. The display control apparatus according to claim 1, wherein
the states of the plurality of imaging apparatuses are displayed based on the acquired state information, the determined image type, and imaging environment information, and
wherein the imaging environment information includes coordinate values indicating installation positions of the plurality of imaging apparatuses and information indicating network connection destinations of the plurality of imaging apparatuses.

11. The display control apparatus according to claim 1, wherein the one or more processors further executes the instructions to
accept a designation of one display method from a plurality of display methods including a first display method and a second display method,
wherein in a case where a designation of the first display method is accepted, the states of the plurality of imaging apparatuses are displayed using an image of the determined image type, and
in a case where a designation of the second display method is accepted, the control is control of displaying the plurality of imaging apparatuses using the images of the plurality of image types such that the image of the determined image type is larger than the images of the other image types.

12. The display control apparatus according to claim 1, wherein images captured by the plurality of imaging apparatuses are used in generating a virtual viewpoint image.

13. The display control apparatus according to claim 1, wherein the state information includes information on a communication state of an imaging apparatus.

14. The display control apparatus according to claim 1, wherein the state information includes information indicating a state of an imaging parameter of an imaging apparatus.

15. The display control apparatus according to claim 1, wherein the state information includes information on a vibration state of an imaging apparatus.

16. A method of controlling a display control apparatus, comprising:

acquiring state information representing states of a plurality of imaging apparatuses;

determining, based on the acquired state information, at least one image type from a plurality of image types representing display formats, the plurality of image types including at least i) an interconnection indication representing a plurality of interconnections between the plurality of imaging apparatuses using lines and ii) a parameter indication by which each imaging parameter for each of the plurality of imaging apparatuses is displayed by a list, the interconnection indication being determined as the image type in a case where an error of a network between the imaging apparatuses occurs, the parameter indication being determined as the image type in a case where an error of a parameter of an imaging apparatus occurs;

generating an image to be displayed based on the acquired state information and the determined image type, the image to be displayed being updated based on detection of a change in the state information; and performing control for displaying of the generated image.

17. The method of controlling the display control apparatus according to claim 16, wherein in the performing, control is performed such that the states of the plurality of imaging apparatuses are displayed using an image of the image type determined in the determining.

18. The method of controlling the display control apparatus according to claim 16, wherein in the performing, control of displaying the states of the plurality of imaging apparatuses is performed such that an image of the image type determined in the determining is larger than images of the other image types based on the state information acquired in the acquiring.

19. A non-transitory computer-readable storage medium storing a computer program for causing a computer to execute a method of controlling a display control apparatus, comprising:

acquiring state information representing states of a plurality of imaging apparatuses;

determining, based on the acquired state information, at least one image type from a plurality of image types representing display formats, the plurality of image types including at least i) an interconnection indication representing a plurality of interconnections between the plurality of imaging apparatuses using lines and ii) a parameter indication by which each imaging parameter for each of the plurality of imaging apparatuses is displayed by a list, the interconnection indication being determined as the image type in a case where an error of a network between the imaging apparatuses occurs, the parameter indication being determined as the image type in a case where an error of a parameter of an imaging apparatus occurs;

generating an image to be displayed based on the acquired state information and the determined image type, the image to be displayed being updated based on detection of a change in the state information; and performing control for displaying of the generated image.

* * * * *